United States Patent
Suzuki et al.

(10) Patent No.: US 11,329,541 B2
(45) Date of Patent: May 10, 2022

(54) LINEAR MOTOR CONTROL APPARATUS AND COMPRESSOR EQUIPPED WITH THE SAME

(71) Applicant: Hitachi Automotive Systems, Ltd., Hitachinaka (JP)

(72) Inventors: Takahiro Suzuki, Tokyo (JP); Shuhei Nagata, Tokyo (JP); Wataru Hatsuse, Tokyo (JP); Masaki Koyama, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 85 days.

(21) Appl. No.: 16/341,177

(22) PCT Filed: Oct. 5, 2017

(86) PCT No.: PCT/JP2017/036319
§ 371 (c)(1),
(2) Date: Apr. 11, 2019

(87) PCT Pub. No.: WO2018/070339
PCT Pub. Date: Apr. 19, 2018

(65) Prior Publication Data
US 2020/0195119 A1    Jun. 18, 2020

(30) Foreign Application Priority Data
Oct. 13, 2016   (JP) .............................. JP2016-201511

(51) Int. Cl.
*H02P 1/00*     (2006.01)
*H02K 41/03*    (2006.01)
(Continued)

(52) U.S. Cl.
CPC .......... *H02K 41/033* (2013.01); *H02P 25/032* (2016.02); *H02P 25/066* (2016.02);
(Continued)

(58) Field of Classification Search
CPC ...... F04B 2203/0401; F04B 2203/0402; F04B 2203/0404; F04B 35/04; F04B 35/045;
(Continued)

(56) References Cited

U.S. PATENT DOCUMENTS

| | | | | |
|---|---|---|---|---|
| 5,083,905 A | * | 1/1992 | Mohn | H02K 33/06 417/45 |
| 5,320,499 A | * | 6/1994 | Hamey | F04B 49/06 417/218 |

(Continued)

FOREIGN PATENT DOCUMENTS

| JP | H11-351143 A | 12/1999 |
|---|---|---|
| JP | 2004-218461 A | 8/2004 |

(Continued)

OTHER PUBLICATIONS

International Search Report with English translation and Written Opinion issued in corresponding application No. PCT/JP2017/036319 dated Jan. 9, 2018.

*Primary Examiner* — Muhammad S Islam
*Assistant Examiner* — Zemenay T Truneh
(74) *Attorney, Agent, or Firm* — Foley & Lardner LLP

(57) ABSTRACT

Provided is a linear motor control apparatus capable of improving estimation accuracy of a resonance frequency immediately after start, and a compressor equipped with the linear motor control apparatus. A linear motor control apparatus includes a winding to which an AC voltage is applied and a mover which is connected to an elastic body, in which the linear motor control apparatus includes an operation mode (1) which monotonously increases amplitude of the AC voltage while keeping a frequency of the AC voltage substantially constant, and an operation mode (2) which changes the frequency of the AC voltage while keeping the amplitude of the AC voltage substantially constant, and
(Continued)

executes the operation mode (1) and the operation mode (2) in this order.

6 Claims, 20 Drawing Sheets

(51) Int. Cl.
*H02P 25/032* (2016.01)
*H02P 25/066* (2016.01)
*H02P 3/00* (2006.01)

(52) U.S. Cl.
CPC ............... *F04B 2203/0401* (2013.01); *F04B 2203/0402* (2013.01); *F04B 2203/0404* (2013.01); *F25B 2400/073* (2013.01)

(58) Field of Classification Search
CPC ............ F25B 2400/073; H02K 41/033; H02P 25/032; H02P 25/064; H02P 25/066; H02P 6/20; G05B 19/00
USPC ............................... 417/44.11, 417; 318/135
See application file for complete search history.

(56) References Cited

U.S. PATENT DOCUMENTS

| | | | | |
|---|---|---|---|---|
| 5,955,799 A * | 9/1999 | Amaya | ............. | H02P 25/032 310/36 |
| 5,980,211 A * | 11/1999 | Tojo | ............. | F04B 49/065 417/45 |
| 6,074,172 A * | 6/2000 | Huang | ............. | F04B 35/045 318/127 |
| 6,231,310 B1 * | 5/2001 | Tojo | ............. | F04B 35/045 417/44.1 |
| 6,977,474 B2 * | 12/2005 | Ueda | ............. | B26B 19/282 318/128 |
| 7,148,636 B2 * | 12/2006 | Ueda | ............. | H02P 25/032 318/114 |
| 10,775,583 B2 * | 9/2020 | Sumioka | ............. | G02B 27/646 |
| 2001/0005320 A1 * | 6/2001 | Ueda | ............. | F04B 49/065 363/95 |
| 2003/0164691 A1 * | 9/2003 | Ueda | ............. | G05B 19/00 318/135 |
| 2004/0005222 A1 * | 1/2004 | Yoshida | ............. | F04B 35/045 417/44.11 |
| 2004/0123195 A1 * | 6/2004 | Rohrbaugh | ............. | G01R 31/31715 714/724 |
| 2004/0169480 A1 * | 9/2004 | Ueda | ............. | B26B 19/388 318/114 |
| 2005/0031470 A1 | 2/2005 | Lee | | |
| 2006/0228224 A1 * | 10/2006 | Hong | ............. | F04B 49/065 417/44.1 |
| 2007/0241698 A1 * | 10/2007 | Sung | ............. | F04B 35/045 318/135 |
| 2009/0148307 A1 * | 6/2009 | Jeong | ............. | F04B 35/045 417/44.1 |
| 2015/0357958 A1 | 12/2015 | Umehara | | |
| 2018/0051690 A1 * | 2/2018 | Stair | ............. | F04B 35/045 |

FOREIGN PATENT DOCUMENTS

| | | |
|---|---|---|
| JP | 2005-054768 A | 3/2005 |
| JP | 2015-231284 A | 12/2015 |

* cited by examiner

LINEAR MOTOR CONTROL APPARATUS AND COMPRESSOR EQUIPPED WITH THE SAME

TECHNICAL FIELD

The present invention relates to a linear motor control apparatus and a compressor equipped with the linear motor control apparatus.

BACKGROUND ART

There is known a linear motor which drives a mover connected to an elastic body at a mechanical resonance frequency in a system of the elastic body and the mover. Since the mechanical resonance frequency fluctuates depending on friction of the mover and a load connected to the mover, it is desirable to effectively estimate the resonance frequency.

For example, PTL 1 discloses a configuration in which a phase of an induced voltage from a search coil is detected, a phase difference between the phase of the induced voltage and a phase of current flowing in a linear motor is detected, and a driving frequency coincides with a resonance frequency of a piston depending on the phase difference. In addition, PTL 1 discloses a configuration in which a stroke of the piston is kept constant by correcting a voltage value of an output voltage by a value corresponding to a frequency of the output voltage.

CITATION LIST

Patent Literature

PTL 1: JP 11-351143 A

SUMMARY OF INVENTION

Technical Problem

In PTL 1, a winding of a linear compressor is provided with the search coil, and the phase of the induced voltage is detected. However, when the search coil is used, wiring is complicated, and furthermore, the searching coil is easily affected by noise, so it is not easy to control to the resonance frequency with high accuracy. In addition, as at the time of start, control suitable for starting the linear motor by securing amplitude of the mover at an early stage is not considered at all.

Therefore, the present invention provides a linear motor control apparatus capable of improving estimation accuracy of a resonance frequency immediately after start, and a compressor equipped with the linear motor control apparatus.

Solution to Problem

In order to solve the above problem, a linear motor control apparatus according to the present invention is a linear motor control apparatus including a winding to which an AC voltage is applied and a mover which is connected to an elastic body, wherein the linear motor control apparatus includes an operation mode (1) which monotonously increases amplitude of the AC voltage while keeping a frequency of the AC voltage substantially constant, and an operation mode (2) which changes the frequency of the AC voltage while keeping the amplitude of the AC voltage substantially constant, and executes the operation mode (1) and the operation mode (2) in this order.

In addition, a compressor according to the present invention is a compressor including a linear motor control apparatus including a winding to which an AC voltage is applied and a mover connected to an elastic body, wherein the linear motor control apparatus includes an operation mode (1) which monotonously increases amplitude of the AC voltage while keeping a frequency of the AC voltage substantially constant, and an operation mode (2) which changes the frequency of the AC voltage while keeping the amplitude of the AC voltage substantially constant, and executes the operation mode (1) and the operation mode (2) in this order and estimates a position of the mover based on a voltage and a current value of the winding.

Advantageous Effects of Invention

According to the present invention, it is possible to provide the linear motor control apparatus capable of improving the estimation accuracy of the resonance frequency immediately after the start, and the compressor equipped with the linear motor control apparatus.

The problems, configurations, and effects other than those described above will be clarified from the description of the embodiments below.

DESCRIPTION OF EMBODIMENTS

Figure 1:
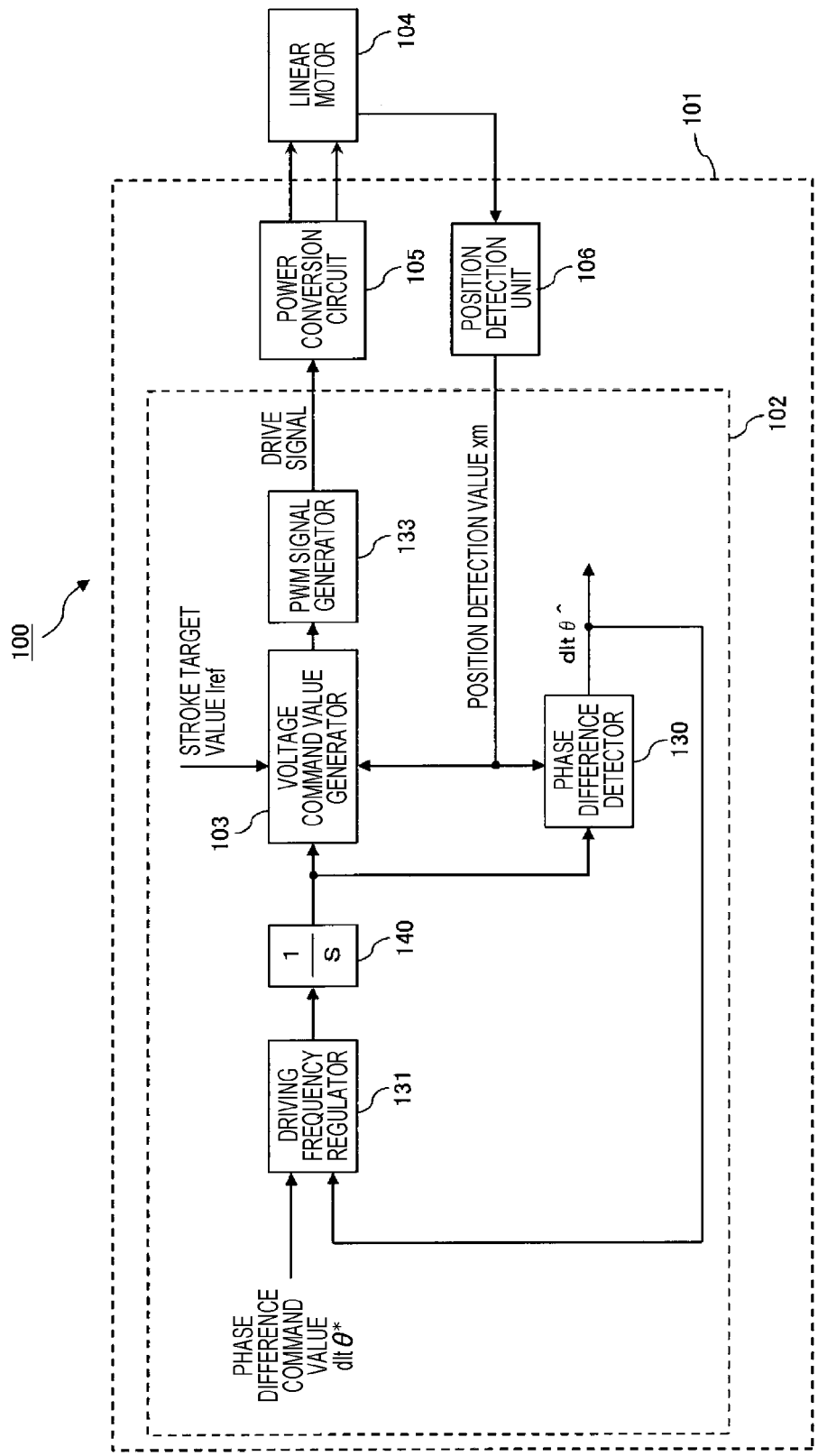
FIG. 1 is an overall schematic configuration diagram of a linear motor system of a first embodiment according to an embodiment of the present invention.

Hereinafter, embodiments of the present invention will be described with reference to the accompanying drawings. Like components are denoted by like reference numerals, and overlapping descriptions thereof are omitted.

Various components of the present invention do not necessarily have to exist individually and independently, but it is allowed that a plurality of components are formed as one member, one component is constituted by a plurality of members, a certain component is a part of other components, a part of a certain component overlaps with a part of other components, and the like.

First Embodiment

In the first embodiment, for convenience of explanation, words such as a front-back direction, a right-left direction, and an up-down direction orthogonal to each other are used, but the gravity direction does not necessarily need to be parallel in a downward direction but can be parallel with the front-back direction, the left-right direction, the up-down direction, or other directions.

<Linear Motor Driving Apparatus 101>

FIG. 1 is an overall schematic configuration diagram of a linear motor system 100 of a first embodiment according to an embodiment of the present invention. The linear motor system 100 is configured to include a linear motor driving apparatus 101 and a linear motor 104. As will be described later, the linear motor 104 has an armature 9 and a mover 6 which move with respect to each other.

The linear motor driving apparatus 101 includes a position detection unit 106, a control unit 102, and a power conversion circuit 105.

The position detection unit 106 detects the relative position (position of the mover) of the mover 6 to the armature 9. In the first embodiment, although the mover 6 moves in a vertical direction, the armature 9 and the mover 6 (field element) may relatively move to each other, and the armature 9 may move in the vertical direction. In the following description, the case where the mover 6 reciprocates in the vertical direction will be described as an example, but the direction of the reciprocating movement is not limited to the vertical direction. For example, the mover 6 may be configured to reciprocate in a horizontal direction, or the mover 6 may be configured so that the mover 6 reciprocates in a direction having an arbitrary angle with respect to the vertical direction. In addition, it goes the same for the armature 9.

In accordance with the detection result of the position detection unit 106, the control unit 102 outputs to the power conversion circuit 105 an output voltage command value or a drive signal (pulse signal) for driving the power conversion circuit 105.

Although details will be described later, the power conversion circuit 105 is an example of a power conversion unit which converts a voltage of a DC voltage source 120 and outputs an AC voltage. It is to be noted that a DC current source may be used instead of the DC voltage source 120.

<Linear Motor 104>

Figure 2:
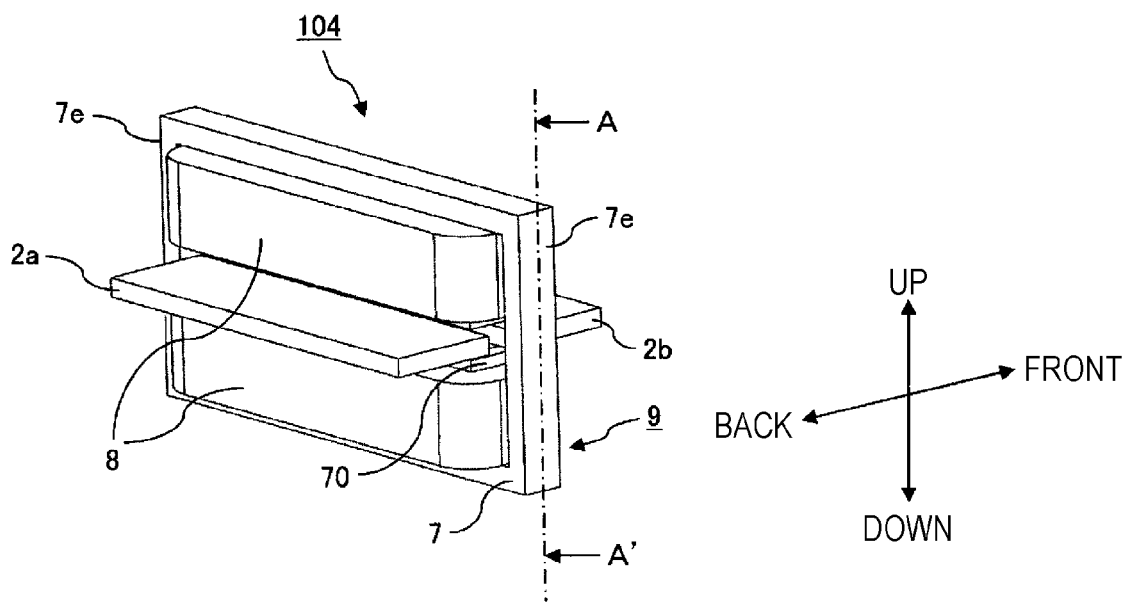
FIG. 2 is a perspective view of a configuration example of an armature.

FIG. 2 is a perspective view of the linear motor 104 (a perspective view of a configuration example of the armature). The linear motor 104 of the first embodiment has the mover 6 which is relatively movable to the armature 9 in a direction (front-back direction) in which permanent magnets 2 (2a and 2b) are arranged. The armature 9 has two magnetic poles 7 facing each other in the up-down direction, with a gap therebetween and windings 8 wound around the magnetic poles 7. The mover 6 is disposed in this gap. The magnetic pole 7 has a magnetic pole tooth 70 as an end face facing to the mover 6.

The armature 9 can apply a force in a front-back direction (hereinafter, referred to as thrust) to the mover 6. For example, as will be described later, the thrust can be controlled so that the mover 6 reciprocates in the front-back direction.

The mover 6 has two flat plate-shaped permanent magnets 2 (2a and 2b) magnetized in the up-down direction. The rear permanent magnet 2a and the front permanent magnet 2b are magnetized in opposite directions to each other. In the first embodiment, the rear permanent magnet 2a has an N pole on an upper side thereof and the front permanent magnet 2b has an S pole on an upper side thereof. In FIG. 2, the permanent magnets 2a and 2b are shown, but the mover 6 is not shown. As the mover 6, for example, a flat plate-shaped mover in which the flat plate-shaped permanent magnet 2 is fixed can be adopted.

The control unit 102 outputs a drive signal so that the mover 6 reciprocates within a range in which the permanent magnets 2a and 2b face the armature 9.

Figure 3:
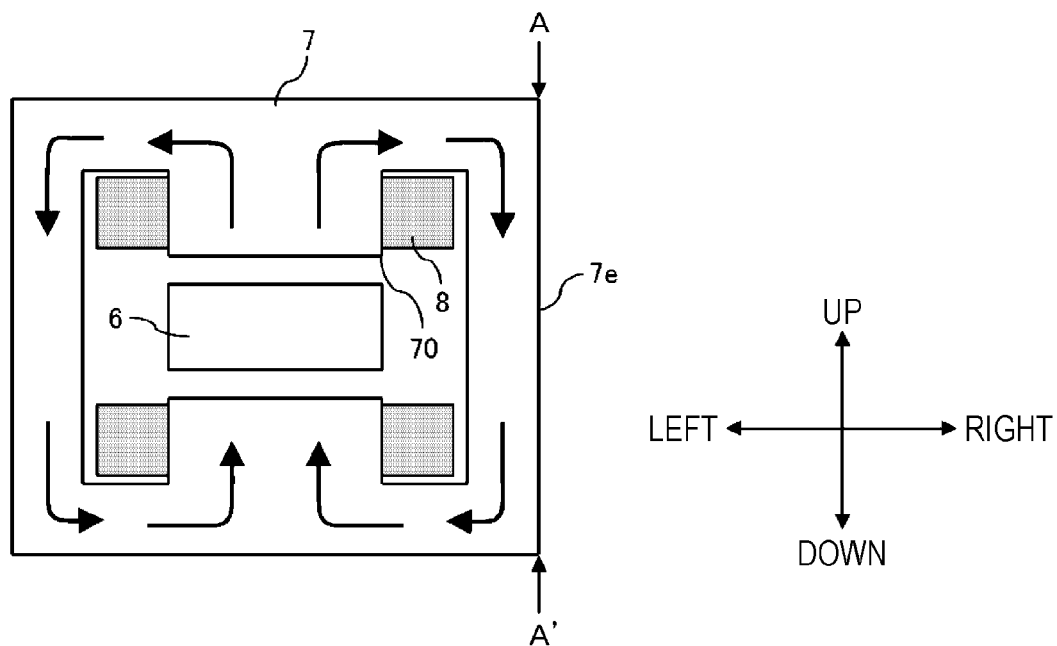
FIG. 3 is a schematic diagram showing a longitudinal cross section of a magnetic pole and a flow of a magnetic flux.

FIG. 3 is a cross-sectional view of a plane taken along the line A-A' of FIG. 2 (A-A' cross-sectional view taken in a direction of arrow A-A'). An arrow line in FIG. 3 shows an example of magnetic flux lines when current flows in two windings 8. Since a flow direction of a magnetic flux can be reversed by a direction of current flowing in the winding 8, the flow direction of the magnetic flux is not limited to one shown in FIG. 3. By this magnetic flux line, the magnetic pole teeth 70 are magnetized.

[Thrust Applied to Mover 6]

Figure 4:
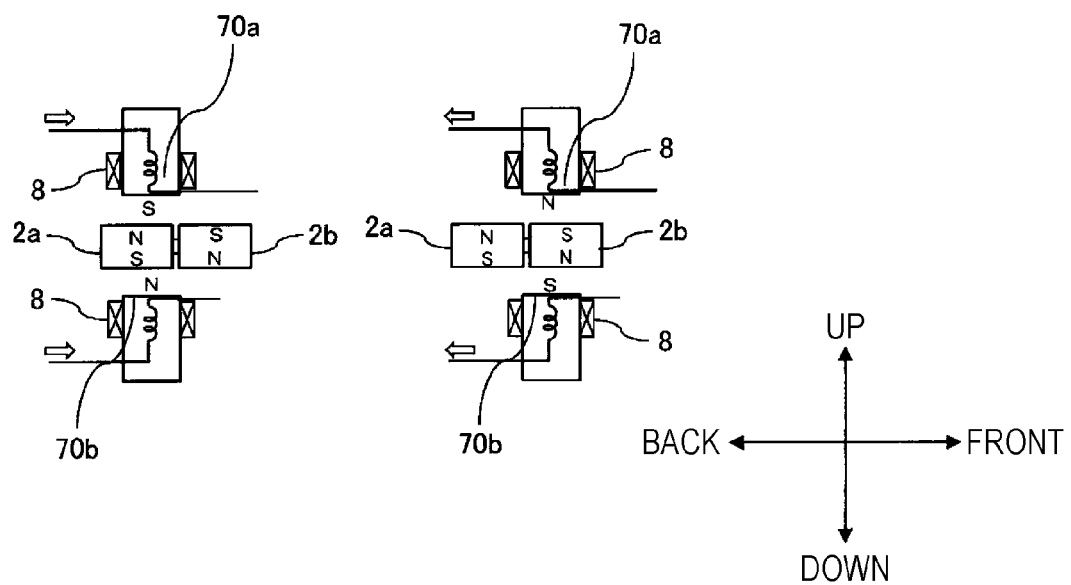
FIG. 4 is an explanatory diagram of polarity generated in magnetic pole teeth.

FIG. 4 is a diagram for describing a thrust applied to the mover 6 by the magnetization of the magnetic pole teeth 70. Polarities of the magnetic pole teeth 70 generated by the current flowing in the winding 8 are represented by "N" and "S" attached to the vicinity of the magnetic pole teeth 70 in the figure. In addition, in FIG. 4, white blank arrows indicate the direction of the current flowing in the winding 8. A diagram on the left of FIG. 4 shows an example in which an upper magnetic pole tooth 70a is magnetized to "S" and a lower magnetic pole tooth 70b is magnetized to "N" by the current flowing in the winding 8, so the mover 6 is applied with a force in a forward direction and the mover 6 moves forward. A diagram on the right of FIG. 4 shows an example in which the upper magnetic pole tooth 70a is magnetized to "N" and the lower magnetic pole tooth 70b is magnetized to "S" by the current flowing in the winding 8, so the mover 6 is applied with a force in a backward direction and the mover 6 moves backward.

In this way, by applying a voltage or current to the winding 8, it is possible to supply a magnetic flux to a magnetic circuit including the two magnetic poles 7 so as to magnetize the two opposing magnetic pole teeth 70 (set of magnetic pole teeth). By applying an AC voltage or an alternating current such as a sine wave or a rectangular wave (square wave) as a voltage or current, a thrust for reciprocating the mover 6 can be applied. In this way, the movement of the mover 6 can be controlled.

The thrust applied to the mover 6 can be changed by changing the amplitude of the applied alternating current or AC voltage. In addition, by appropriately changing the thrust applied to the mover 6 using a known method, a displacement of the mover 6 can be changed as desired. Here, when the mover 6 performs a reciprocating motion (for example, a motion occurring in the mover 6 by sequentially repeating the magnetization of the magnetic pole teeth 70 as shown in the diagrams on the left and right of FIG. 4), the amount of change in the displacement of the mover 6 which is changed in an alternating current waveform is called a stroke.

Since the magnetic pole teeth 70 are magnetic bodies, a magnetic attraction force for attracting the permanent magnet 2 acts. In the first embodiment, since the two magnetic pole teeth 70 face each other with a gap therebetween so as to have the mover 6 sandwiched therebetween, a resultant force of the magnetic attraction force acting on the mover 6 can be reduced.

[Mechanism Outside Mover 6]

Figure 5:
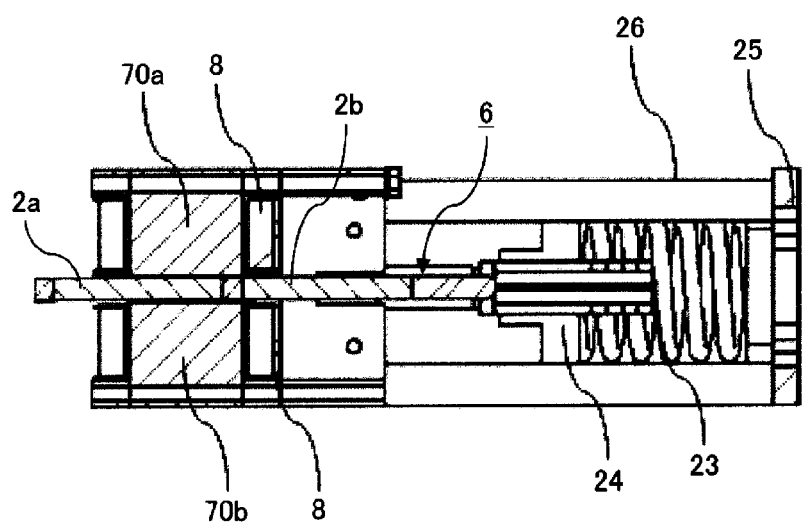
FIG. 5 is an explanatory diagram of an external mechanism connected to a mover.

FIG. 5 is an explanatory view of an external mechanism connected to the mover 6, and is a diagram for describing an example in which the external mechanism, which is constituted by a resonance spring 23 which is a coil spring and is connected to one end of the mover 6, returns the mover 6 using a spring force. One end of the resonance spring 23 is connected to the mover 6 via an intermediate portion 24, and the other end thereof is fixed to a base portion 25. In addition, a side portion 26 extending substantially in parallel with an extending direction of the resonance spring 23 and guiding or supporting the resonance spring 23 is provided. When the linear motor 104 reciprocates, acceleration and deceleration are repeated each time a motion direction of the mover 6 is changed. During the deceleration, a speed energy of the mover 6 is converted into electric energy (regenerative operation), but a loss occurs due to resistance of wiring to the linear motor 104. On the other hand, as shown in FIG. 5, when the resonance spring 23 (assist spring) is added to the mover 6 and the mover 6 reciprocates at a mechanical resonance frequency determined from a mass of the mover 6 and a spring constant, the speed energy of the mover 6 can be effectively utilized and a highly efficient linear motor drive system can be configured. Instead of the resonance spring 23, a known elastic body may be used. With this configuration, the external mechanism may be configured in a mover (field element) moving type which the mover 6 (field element 6) moves in the vertical direction, but may be configured in an armature moving type in which the armature 9 moves in the vertical direction by connecting the elastic body to the armature 9 instead of the mover 6.

Figure 6:
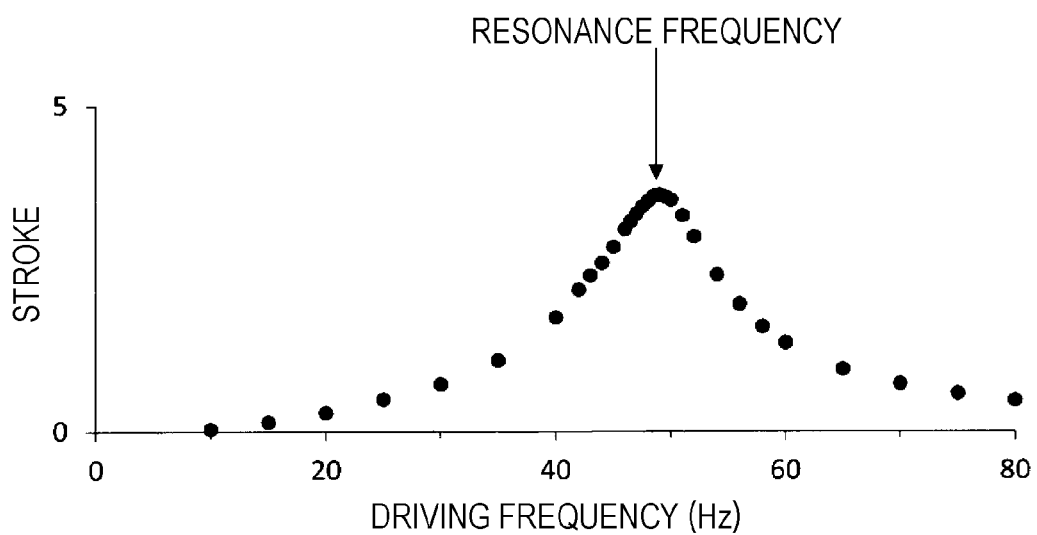
FIG. 6 is an explanatory diagram of a relationship between a driving frequency and a stroke.

FIG. 6 is a diagram for describing a relationship between a driving frequency and a stroke, and is a diagram showing the relationship between the driving frequency of the AC voltage represented on a horizontal axis and the stroke of the mover 6 represented on a vertical axis. The amplitude of the AC voltage at each driving frequency is the same. In FIG. 6, characteristics in which the stroke of the mover 6 is steeply increased in the vicinity of the resonance frequency and the stroke is decreased when it is separated from the resonance frequency can be seen. The resonance frequency is given by a square root of a value obtained by dividing a spring constant k of the resonance spring 23 by a mass m of the mover 6, but this value is an approximate value by a system of the linear motor 104.

In this way, by applying the resonance frequency or the AC voltage of the driving frequency in the vicinity of this resonance frequency, it is possible to vibrate with a large stroke (large energy). In other words, in the case of controlling the linear motor 104 in which the elastic body such as the resonance spring 23 is added to the mover 6, it is important to detect or estimate the resonance frequency of the mover 6. It is important to detect or estimate the resonance frequency of the mover 6 even when the stroke of the mover 6 is controlled as desired.

[Phase Relationship During Driving]

Figure 7:
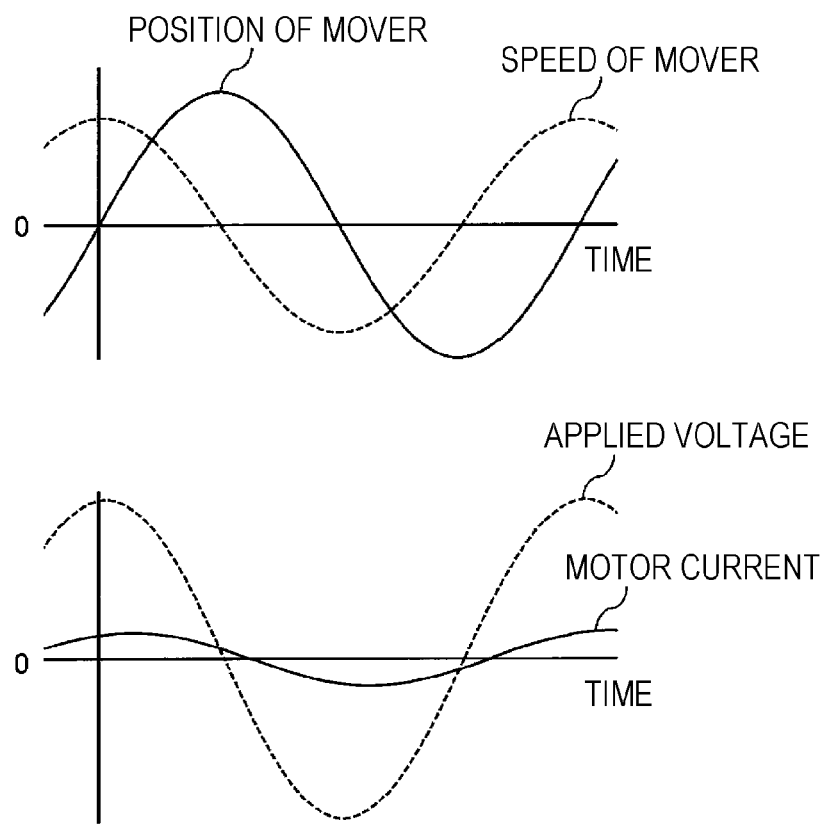
FIG. 7 is an explanatory diagram of a phase relationship between a position of the mover and a speed of the mover and a phase relationship between an applied voltage and current.
Figure 8:
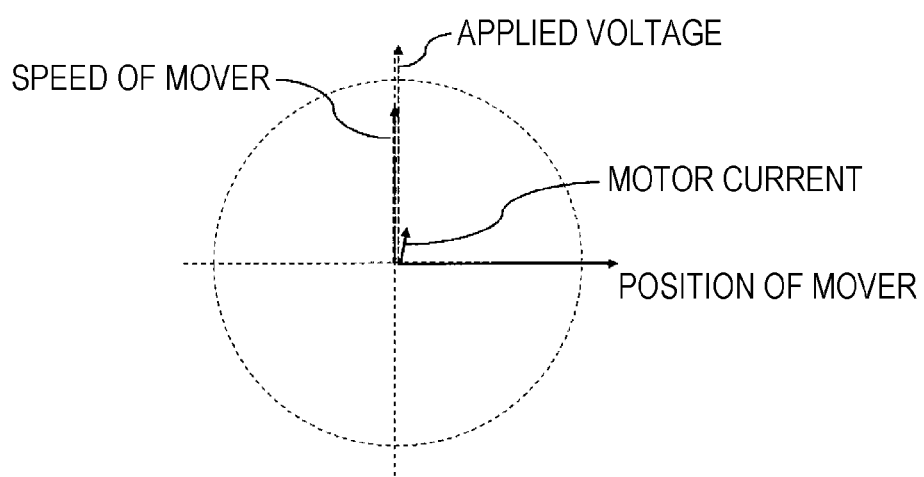
FIG. 8 is a vector diagram of an applied voltage and current.

FIG. 7 is an explanatory diagram of a phase relationship between the position of the mover and the speed of the mover and a phase relationship between the applied voltage and current. An upper part in FIG. 7 shows a temporal change in the position and speed of the mover 6 when the linear motor 104 is driven, and a lower part in FIG. 7 shows the relationship between the applied voltage waveform and a temporal change in the current flowing through the linear motor 104. FIG. 8 is a diagram showing an alternating waveform of FIG. 7 as a vector. It can be seen that the speed of the mover 6, the applied voltage, and the motor current are substantially in phase.

In addition, it is known that when the resonance spring 23 is added to the mover 6 and the mover 6 reciprocates at the mechanical resonance frequency determined from the mass of the mover 6 and the spring constant, the phase of the position of the mover 6 is a phase difference of 90° with respect to each of phases of an applied voltage Vm to the winding 8, a motor current Im, and the speed of the mover 6. That is, when any of these relationships is established, it can be estimated that the mover 6 is driven at the resonance frequency.

In the case where the mass of the mover 6 is deviated from the estimation due to manufacturing variations or when the mass connected to the resonance spring 23 is changed due to a load element added to the mover 6, the resonance frequency is changed. In addition, when the mover 6 starts from the state in which the resonance frequency is changed, the stroke of the mover 6 may be greater than estimated and abnormal noise and vibration may occur. Even in such a case, in order to obtain a desired stroke, it is preferable to detect or estimate the resonance frequency varying depending on conditions with high accuracy. In addition, it is preferable to keep the mover within the range of the desired stroke even in a transient state during the start. Hereinafter, a start sequence and a method of detecting or estimating a resonance frequency will be described.

<Outline of Control Unit 102>

The control unit 102 and the like will be described with reference to FIG. 1 and the like. A position detection value xm from the position detection unit 106 is input to the control unit 102. The input position detection value xm is input to a phase difference detector 130 together with a phase command value θ* generated by the control unit 102, and an estimated phase difference value dltθ^ is output. A deviation between the phase difference command value dltθ* and the estimated phase difference value dltθ^ which are target values is input to a driving frequency regulator 131. The driving frequency regulator 131 outputs a frequency command value ω*. An applied voltage based on the frequency command value ω* is output to the linear motor 104. As the position detection unit 106, a position sensor which detects a relative position of the mover 6 and the armature 9, and a calculation unit using the applied voltage Vm or the motor current Im and the like to estimate the relative position, and the like can be adopted. That is, the position detection value xm may be a detection value by the position sensor, but it may also be an estimation value obtained by using the applied voltage Vm or the motor current Im.

<Voltage Command Value Generator 103>

Figure 9:
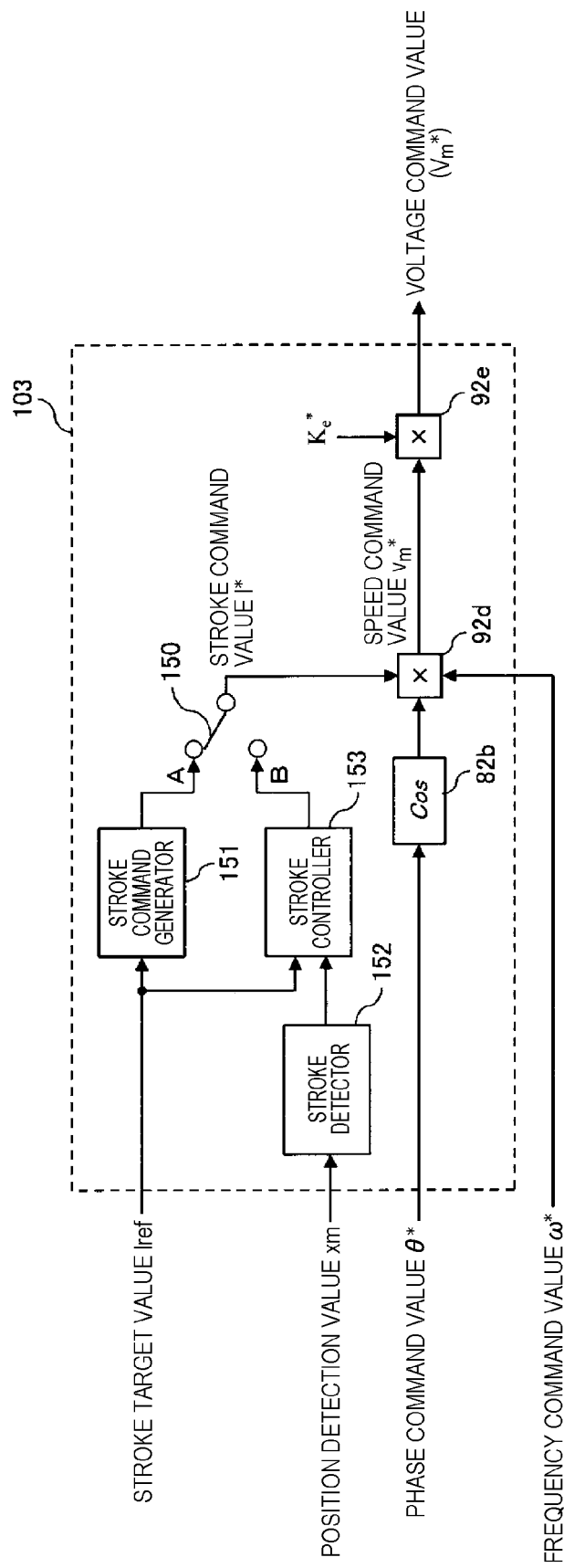
FIG. 9 is an explanatory diagram showing a configuration example of a voltage command value generator 103.

FIG. 9 is an explanatory diagram showing a configuration of a voltage command value generator 103. The phase command value θ* to be described later, a stroke target value lref output from a host controller (not shown), and the like, and the position detection value xm are input, and a single-phase AC voltage command value Vm* is output to the voltage command value generator 103. A detailed description of some of the components will be described later. By changing any one of a stroke command value l*, a phase command value θ*, and a speed command value vm*, it is possible to regulate the voltage Vm* to be applied to the linear motor 104. That is, by regulating the amplitude and frequency of the applied voltage, it is possible to control the driving frequency to the resonance frequency or to control the stroke.

In the first embodiment, a value obtained by multiplying a sine (sin θ*) of a reference phase θ* by the target value lref output from the host controller (not shown) or the like is set as a position command value xm* of the mover 6. First, the phase command value θ* is input to a cosine calculator 82b (output a cosine of an input value), and a cosine (cos θ*) for a phase command value θ* is obtained. The cosine, the stroke command value l*, and the frequency command value ω* are multiplied by a multiplier 92d. By doing this, it is possible to obtain the speed command value vm* of the mover 6 without performing a differentiation calculation. Generally, one of the position command value xm* and the speed command value vm* can be a sine and the other thereof can be a cosine. It is necessary to add a minus sign depending on the combination, which will be obvious to those skilled in the art.

In addition, the speed instruction value vm* of the mover 6 and the induced voltage constant Ke* are multiplied by a multiplier 92e to obtain the single-phase AC voltage command value Vm*.

In addition to the above values, a driving voltage command method of a known synchronous motor can be applied to the voltage command value generator 103. A stroke command generator 151, a stroke detector 152, and a stroke controller 153 will be described later.

[Start Sequence]

Figure 10:
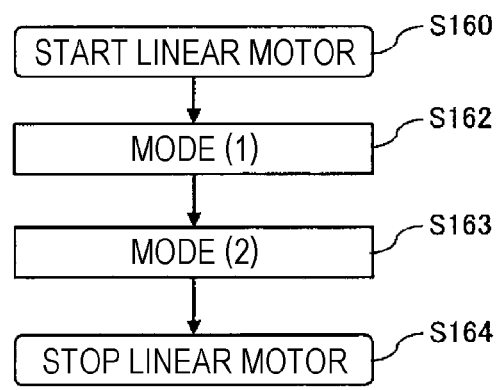
FIG. 10 is an explanatory diagram of a start sequence.

FIG. 10 is a diagram for explaining a start sequence at the time of starting the linear motor 104 according to the first embodiment. The start sequence of the first embodiment includes two of mode (1) step S162 and mode (2) step S163. In the mode (1), the driving frequency is controlled to be substantially constant, and the stroke is controlled so as to be gradually increased from substantially zero. By doing so, it is possible to prevent the mover 6 from suddenly moving and colliding with other members. In the mode (2), first, control is performed to change the driving frequency while keeping the amplitude of the voltage substantially constant. When the stroke fluctuates, the resonance frequency value fluctuates due to the fluctuation of the frictional loss amount of the mover 6. Therefore, by suppressing the fluctuation in the amplitude of the voltage, the stroke variation can be suppressed and the search of the resonance frequency can be facilitated. Next, in the mode (2), control is performed to change the driving frequency while increasing the amplitude of the voltage. Since the driving frequency can be brought close to the resonance frequency by the control of the early stage of the mode (2), if the amplitude of the voltage is subsequently increased, it is easy to follow the variation of the resonance frequency to some extent.

Figure 11:
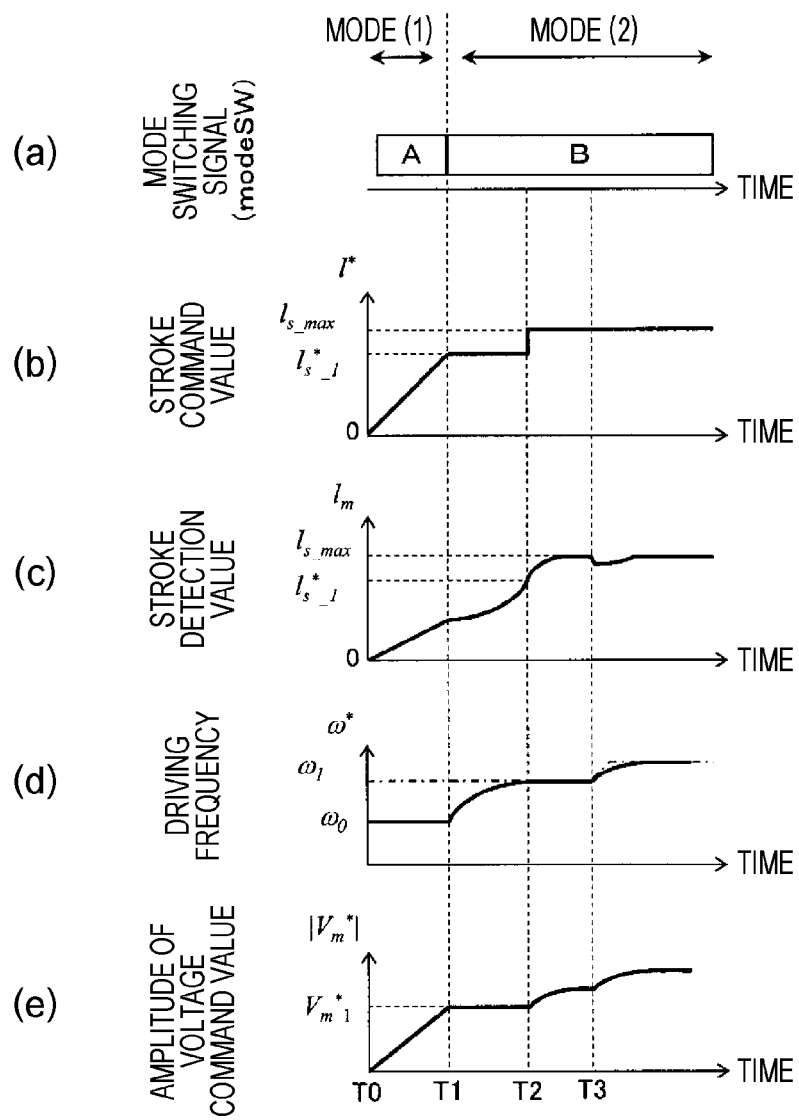
FIG. 11 is a view for describing a temporal change in a main command value in each mode.

FIG. 11 is a view for describing a temporal change in a main command value in each mode. As shown in FIG. 11(a), the linear motor 104 starts at time T0, and is in the mode (1) from time T0 to time T1 and the mode (2) after time T1 to start. In FIGS. 11(b) to 11(e), a horizontal axis represents time, and a vertical axis represents the stroke command value l*, the stroke detection value lm, the frequency (driving frequency) ω* of the applied voltage, the amplitude (amplitude of voltage command value) |Vm*| of the applied voltage amplitude.

When a start instruction to start the linear motor 104 is issued from the host controller (not shown) or the like, the linear motor 104 is transitioned to the mode (1) step S162. In the mode (1) step S162, the stroke command l* is monotonically increased (for example, linearly increased). The stroke command value l* can deviate from the stroke detection value lm depending on whether the driving frequency ω* substantially coincides with the resonance frequency. When the stroke command l* is increased, the linear motor 104 increases the amplitude |Vm*| of the applied voltage. Accordingly, the stroke lm of the mover 6 also increases. In the mode (1) step S162, the driving frequency command value ω* is maintained at a substantially constant value ω0.

By monotonically increasing the stroke command l* from zero, it is possible to suppress the mover 6 of the linear motor 104 from suddenly moving and to reduce the vibration or noise. When an initial value of the stroke command l* is set to non-zero, if a value immediately after the start of the driving frequency ω* substantially coincides with the resonance frequency, there is a possibility that the amplitude of the mover 6 is excessively increased.

It is preferable that the initial value (ω0) of the driving frequency output from the control unit 102 is set to substantially coincide with a resonance frequency of a mass-spring system including the resonance spring 23, but it is not easy to estimate the resonance frequency with high accuracy. For example, the stroke command value is usually different from the estimated value due to the mass of the mover 6, the deviation of the spring constant of the resonance spring 23, a variation of a load that can be attached to the mover 6, or the like. Therefore, the stroke command value l* tends to deviate from the stroke detection value lm, in particular, immediately after the start.

Therefore, the actual stroke lm of the mover 6 shown in FIG. 11(c) tends to be smaller than the stroke command l* shown in FIG. 11(b), and for example, when the load fluctuates, it is possible to prevent the stroke lm from excessively becoming large. In addition, it is possible to suppress the actual stroke lm from excessively becoming large by suppressing the fluctuation of the driving frequency command value ω* immediately after the start while increasing the stroke command l* or the amplitude of the voltage command value even when the initial value of the driving frequency ω* does not coincide with the resonance frequency.

In the mode (1) step S162, the stroke command l* is a smaller value ls*_1 than a maximum stroke length ls_max (for example, maximum movable length of the mover 6). Even if the stroke of the mover 6 becomes greater than estimated, damage to the mover 6 and the load element added to the mover 6 can be avoided.

When the amplitude |Vm*| of the voltage command value Vm* reaches a predetermined value (mode transition voltage command value Vm*1), the transition to the mode (2) step S163 is made. Time when the amplitude |Vm*| of the voltage command value Vm* reaches the mode transition voltage command value Vm*1 is set to T1. The mode transition voltage command value Vm*1 can be determined as a value equal to or higher than the voltage command value at which the resonance frequency can be detected or estimated. This is because if the amplitude or speed of the mover 6 is not large to some extent, it is difficult to estimate the resonance frequency of the mover 6. Specifically, it is possible to determine the mode transition voltage command value Vm*1 by acquiring the relationship between the frequency or amplitude of the voltage applied to the linear motor 104 and whether the resonance frequency can be detected or estimated in advance.

In the mode (2) step S163, the resonance frequency is detected or estimated, and the driving frequency is controlled so as to coincide with the resonance frequency. The stroke command value l* is kept substantially constant. A period from time T1 to time T2 is controlled in such a manner that the driving frequency ω* approaches a resonance frequency ωres=ω1 and the stroke detection value lm approaches a stroke reference value (ls*_1). Time when the stroke command value l* substantially coincides with the stroke detection value lm is set to T2.

When the time reaches time T2, the linear motor driving apparatus 101 increases the stroke command value l*, for example, changes the stroke command value l* to the maximum stroke length ls_max. Accordingly, the stroke detection value is controlled so as to approach the stroke command value (ls_max) by controlling (increasing) the amplitude |Vm*| of the voltage command value Vm*. Since it is assumed that there is no fluctuation in the load element added to the mover 6 and there is no change in the resonance frequency in a period between time T2 and time T3, the driving frequency can maintain the resonance frequency, and therefore is not changed. However, the case in which the fluctuations occur in the load elements is also considered. In such a case, it is preferable to perform the control at the following time T3.

At the time T3, for example, the mass connected to the resonance spring 23 is changed (lightened) by the load element added to the mover 6. When the mass connected to the resonance spring 23 becomes light, the square root of the value obtained by dividing the spring constant k of the resonance spring 23 by the mass m of the mover 6 is increased, and the resonance frequency ωres is increased. As described above, when the driving frequency deviates from the resonance frequency, the stroke is decreased in the state where the same voltage amplitude is applied, as can be seen from the relationship of FIG. 6.

In the period of the mode (2) step S163, as described above, the resonance frequency is detected or estimated, and the driving frequency is controlled so as to coincide with the resonance frequency. Therefore, the driving frequency ω* is controlled so as to approach the resonance frequency ωres (>ω1) (increase the driving frequency). At this time, preferably, the amplitude |Vm*| of the voltage command value Vm* is increased in such a manner that the stroke detection value lm approaches the stroke command value ls_max.

On the other hand, when the load element becomes heavy, the driving frequency ω* is decreased. It should be noted that the load element may be simply a mass or may be one which is connected to the linear motor 104 to receive work. It can be determined whether the driving frequency coincides with or deviates from the resonance frequency by various known methods such as a method of observing a current value. Since the spring constant of the linear motor 104 does not fluctuate, it can be detected that the mass fluctuates depending on the fluctuation of the resonance frequency.

<Details of Control Unit 102>

The control unit 102 shown in FIG. 1 is configured to include the phase difference detector 130, the driving frequency regulator 131 which regulates the driving frequency command value ω* so that the phase difference estimation value dltθ^ follows up the phase difference command value dltθ* based on the output dltθ^ of the phase difference detector 130 and the phase difference command value dltθ*, an integrator 140 which integrates the driving frequency command value ω* to generate a phase command value θ*, the voltage command value generator 103 which outputs the voltage command value V* based on the phase command value θ* and the stroke command value l* (stroke target value Iref) of the mover 6, and a PWM signal generator 133 which compares the voltage command value V* with a triangular carrier signal to output a drive signal which drives the power conversion circuit 105 outputting a voltage. It is to be noted that the power conversion circuit 105 may output current. In this case, the current command value generator may be provided instead of the voltage command value generator 103.

<Reference Phase Generator>

For obtaining information on the relative position xm between the mover 6 and the armature 9, since it is sufficient to use the output in the case of using the position sensor, the known position sensor may be used as appropriate. Although the configuration of estimating the resonance frequency from the phase difference between the phase of the position of the mover 6 and the applied voltage Vm or the motor current Im to the winding 8 will be described, first, a reference phase (phase of the mover 6) which becomes a reference of a phase will be described.

The reference phase (phase command value θ*) of the first embodiment is obtained by integrating the driving frequency command value ω* which is the output of the driving frequency regulator 131 of FIG. 1 by the integrator 140 as the reference phase generator. That is, the reference phase is the phase θ* at each time of a wave having the driving frequency command value ω* corresponding to the target frequency of the applied voltage Vm (θ*). As described above, in the first embodiment, an integrated value of the driving frequency command value ω* of the driving frequency regulator 131 is used as the reference phase θ*, but for example, an integrated value of a mechanical resonance frequency of a vibrator including the mover 6 may be fixed.

By using the reference phase θ* as the phase of the applied voltage Vm, for example, the reference phase θ* can be applied even when the position of the mover 6 is detected or estimated. While the driving frequency command value ω* is constant, the reference phase θ* may be a saw tooth wave whose range is [−π, π], [0, 2π], or a range wider than [−π, π] and [0, 2π] based on each time or may be linearly increased based on time. As will be described later, when the driving frequency command value ω* fluctuates, the saw tooth wave or the linearly increasing shape fluctuates (the inclination changes) accordingly.

Of course, the reference phase θ* may be obtained using the position detection value xm by the position detection unit 106. In the case of using the position detection value xm, for example, a total moving length of a displacement in one period in which the mover 6 reciprocates is set to 360°, and the reference phase θ can be obtained based on a ratio of a position (=displacement) of the mover 6 from the reference position (for example, an intermediate point of the reciprocating motion and a maximum or minimum position of the reciprocating motion) and a length corresponding to the total moving length.

<Phase Difference Detector 130>

When the mover 6 is reciprocating, the position xm of the mover 6 is a periodic function. Since the periodic function can be represented by a Fourier series, when the position xm of the mover 6 is expressed by using the Fourier transform, the periodic function can be defined as the following Equation (1).

[Equation 1]

$$x_m = x_0 + \sum_{n=1}^{\infty} \{a_n \cdot \cos(n\omega_0 t) + b_n \cdot \sin(n\omega_0 t)\} \quad (1)$$

In the above Equation (1), $x_0$ is a DC offset value, $a_n$ and $b_n$ are n-th order Fourier coefficients, and are obtained by the following Equations (2) and (3).

[Equation 2]

$$a_n = \frac{2}{T_0} \cdot \int_{-\frac{\pi}{2}}^{\frac{\pi}{2}} x_m \cdot \cos(n\omega_0 t) dt \quad (2)$$

[Equation 3]

$$b_n = \frac{2}{T_0} \cdot \int_{-\frac{\pi}{2}}^{\frac{\pi}{2}} x_m \cdot \sin(n\omega_0 t) dt \quad (3)$$

In the above Equations (2) and (3), $T_0$ is a period (period at which the mover 6 reciprocates) of a fundamental wave, that is, a reciprocal of a primary frequency (driving frequency).

In the case of performing a control to drive the mover 6 at the resonance frequency, a high-order component is not important, and it is preferable to focus on the primary component, that is, the driving frequency component. In particular, the phase of the primary frequency component (driving frequency component) of the position xm of the mover 6 is important. By an arctangent of the first-order Fourier coefficient, the position xm of the mover 6 with respect to a sinusoidal applied voltage V can be obtained by the following Equation (4).

[Equation 4]

$$\hat{\theta}_{pos} = \tan^{-1}\left(\frac{b_1}{a_1}\right) = \tan^{-1}\left(\frac{\int_{-2\pi}^{0} x_m \cdot \sin\omega_0 t\, dt}{\int_{-2\pi}^{0} x_m \cdot \cos\omega_0 t\, dt}\right) \quad (4)$$

In the above Equation (4), an integration range is set to −2π to 0. This is because when the phase difference detector 130 is realized by a semiconductor integrated circuit such as a microcomputer, a digital signal processor (DSP), or the like, only past information can be acquired.

Figure 12:
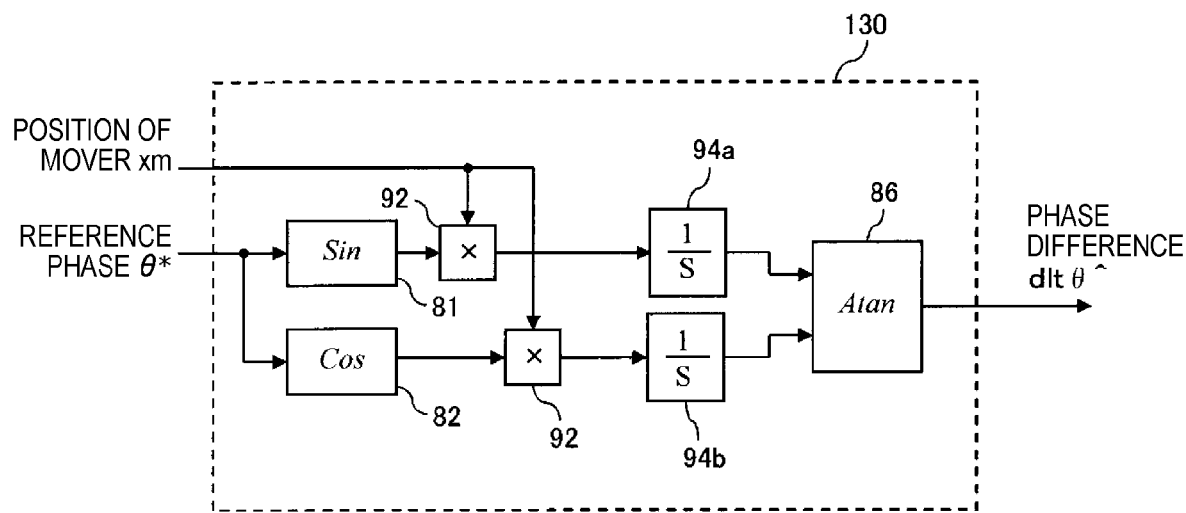
FIG. 12 is an explanatory diagram of a configuration example of a phase difference detector and a relationship between a driving frequency and an output of the phase difference detector.
Figure 12:
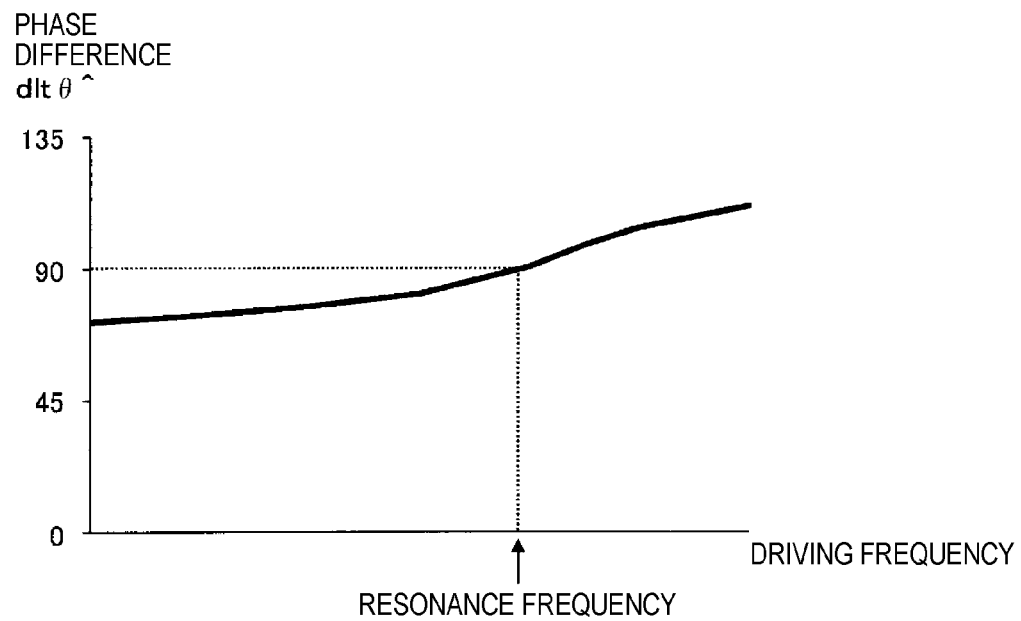

FIG. 12 is an explanatory diagram of a configuration example of the phase difference detector and a relationship between the driving frequency and the output of the phase difference detector, and an upper part of FIG. 12 is an explanatory diagram in the case where the above Equation (4) is shown as a block diagram, and a lower part of FIG. 12 is an explanatory diagram of a relationship between the driving frequency and the output of the phase difference detector 130. The phase command value θ* is input to a sine calculator 81 (output a sine of the input value) and a cosine operator 82 (output a cosine of the input value), respectively, to obtain the sine and cosine of the phase command value θ*. A value obtained by multiplying each of the sine and the cosine by the position xm of the mover 6 is output from a multiplier 92. First-order Fourier coefficients of sine and cosine, respectively, are obtained by integrating each output with integrators 94a and 94b. That is, higher-order frequency components than the driving frequency ω of Fourier expansion can be erased, and therefore can be robust against high-order noise.

The outputs of the integrators 94a and 94b are input to an arctangent device 86. The arctangent device 86 outputs an arctangent value based on the input sine and cosine components. The arctangent device 86 of the first embodiment may output the arctangent value of the phase with a numerator being an output of the integrator 94a and a denominator being an output of the integrator 94b, but output a value with the numerator and the denominator being reversed. The lower part of FIG. 12 shows the relationship between a frequency (horizontal axis) of the AC voltage and an output value (phase difference dltθ^) (vertical axis) of the arctangent device 86. As can be seen from the lower part of FIG. 12, in the first embodiment, when the driving frequency coincides with the resonance frequency, 90° is output from the arctangent device 86. The value output from the arctangent device 86 is larger than 90° when the driving frequency is higher than the resonance frequency and smaller than 90° when the driving frequency is lower than the resonance frequency. By doing so, it is possible to obtain the phase difference dltθ^ of the primary frequency component of the input AC signal (the position xm of the mover 6 in the first embodiment) to the phase difference detector 130 with respect to the reference phase θ* and estimate the resonance frequency. For example, when the phase difference dltθ^ exceeds 90°, control may be performed so as to decrease the phase difference dltθ^, whereas when the phase difference is less than 90°, control may be performed so as to increase the phase difference dltθ^. It is preferable to control the phase difference dltθ^ when the reference phase θ* and the fundamental frequency θ have the same value to be the target value dltθ*.

Instead of the integrators 94a and 94b, an incomplete integrator can be used. The incomplete integrator is a type of low-pass filter and can be configured similarly to a first-order lag filter. Alternatively, a high-pass filter (not shown) may be provided in front of the integrators 94a and 94b (or incomplete integrator) in place of or in addition to the incomplete integrator. A cutoff frequency of the high-pass filter can be, for example, 10 or 5 Hz or less.

As described above, the phase difference detector 130 uses the arctangent of the ratio of the first-order Fourier coefficients of the driving frequency component, and has a large sensitivity only to the primary frequency component of the input AC signal to the phase difference detector 130 when obtaining the phase θ of the position xm of the mover 6 with respect to the AC voltage command value V*. That is, for example, even when DC offset or high-order noise is superimposed on the position xm of the mover 6, the phase dltθ of the primary frequency component of the input AC signal to the phase difference detector 130 with respect to the reference phase θ* can be obtained more accurately. In addition, when the high-pass filter is provided as described above, the high-pass filter can be robust for a frequency smaller than the driving frequency ω.

Therefore, as the method of detecting the position of the mover 6, in a case of adopting a system in which noise is likely to be superimposed, for example, a system in which an inductance position dependence of the mover is large, or a system in which another device is present therearound, particularly effective control can be realized. In this way, it is possible to detect or estimate the resonance frequency with high accuracy, and drive a linear motor with high efficiency.

<Driving Frequency Regulator 131>

Figure 13:
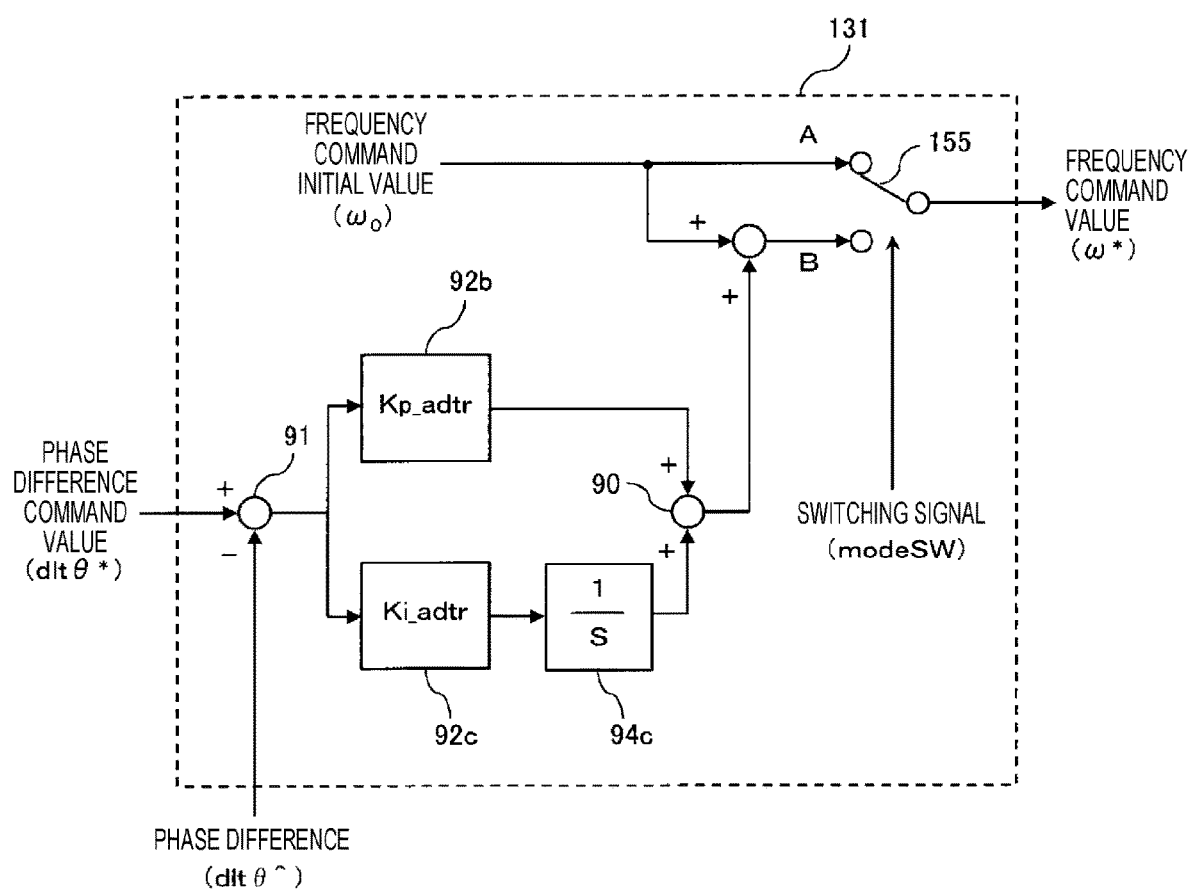
FIG. 13 is an explanatory diagram showing a configuration example of a driving frequency regulator 131.

FIG. 13 is a diagram illustrating a configuration example of the driving frequency regulator 131. A frequency command switcher 155 switches between two inputs according to a mode switching signal (mode SW) which is a command for switching between the mode (1) and the mode (2). In the mode (1) step S162 (FIG. 10), a value input to an A side of the frequency command switcher 155 is output. That is, the initial value ($\omega_0$) of the driving frequency command is output as the frequency command value ω* as it is. In the mode (2) step S163 (FIG. 10), a value input to a B side of the frequency command switcher 155 is output. The value input to the B side is determined as follows.

The driving frequency regulator 131 outputs the driving frequency command value ω* by allowing a subtractor 91 to obtain a difference between the phase difference command value dltθ* (for example, 90°) and the phase difference dltθˆ obtained by the phase difference detector 130 and allowing an adder 90 to add an proportional-controlled operation result which a multiplier 92b obtains by multiplying the obtained difference by a proportional gain Kp_adtr and an integral-controlled operation result which an integrator 94c obtains by integrating the result obtained by allowing a multiplier 92c to multiply the obtained difference by an integral gain Ki_adtr.

The phase difference command value dltθ* may be obtained from the host controller (not shown in the first embodiment) or may be set to, for example, 90° in advance as in the first embodiment. In addition, the driving frequency regulator 131 in the first embodiment has a proportional integral control configuration, but other control configurations such as the proportional control or the integral control may also be applied.

[Implementation of High Efficiency Driving]

An operation of the phase difference detector 130 and the driving frequency regulator 131 when the linear motor 104 is driven at the mechanical resonance frequency determined from the mass of the mover 6 and the spring constant will be described.

For example, if the mass of the mover 6 is heavier than the design value, the actual resonance frequency is lower than the design value. That is, if the initial value of the driving frequency is determined using the mass design value of the mover 6 (when the design value is used to determine the initial value of the driving frequency command value ω*), the linear motor is driven at a frequency higher than the actual resonance frequency. At this time, the phase difference dltθˆ which is obtained by the phase difference detector 130 is greater than the phase difference command value dltθ*. Therefore, the driving frequency regulator 131 performs control to reduce the driving frequency command value ω*, so the driving frequency command value ω* coincides with the actual resonance frequency. As a result, it is possible to effectively use the speed energy of the mover 6 and drive the linear motor 104 with high efficiency.

<Voltage Command Value Generator 103>

As described with reference to FIG. 9, the phase command value θ* and the stroke command value l* are input to the voltage command value generator 103, and the single-phase AC voltage command value Vm* is output. This will be described in detail below.

A stroke command switcher 150 switches two inputs according to a mode switching signal (modeSW) shown in FIG. 13. By changing any one of a stroke command value l*, a phase command value θ*, and a speed command value vm*, it is possible to regulate the voltage to be applied to the linear motor 104. That is, by regulating the amplitude and frequency of the applied voltage, it is possible to control the driving frequency to the resonance frequency or to control the stroke.

In the mode (1) step S162 (FIG. 10), an output value of the stroke command generator 151 which is input to an A side of the stroke command switcher 150 (see FIG. 9 and the like) is output.

Figure 14:
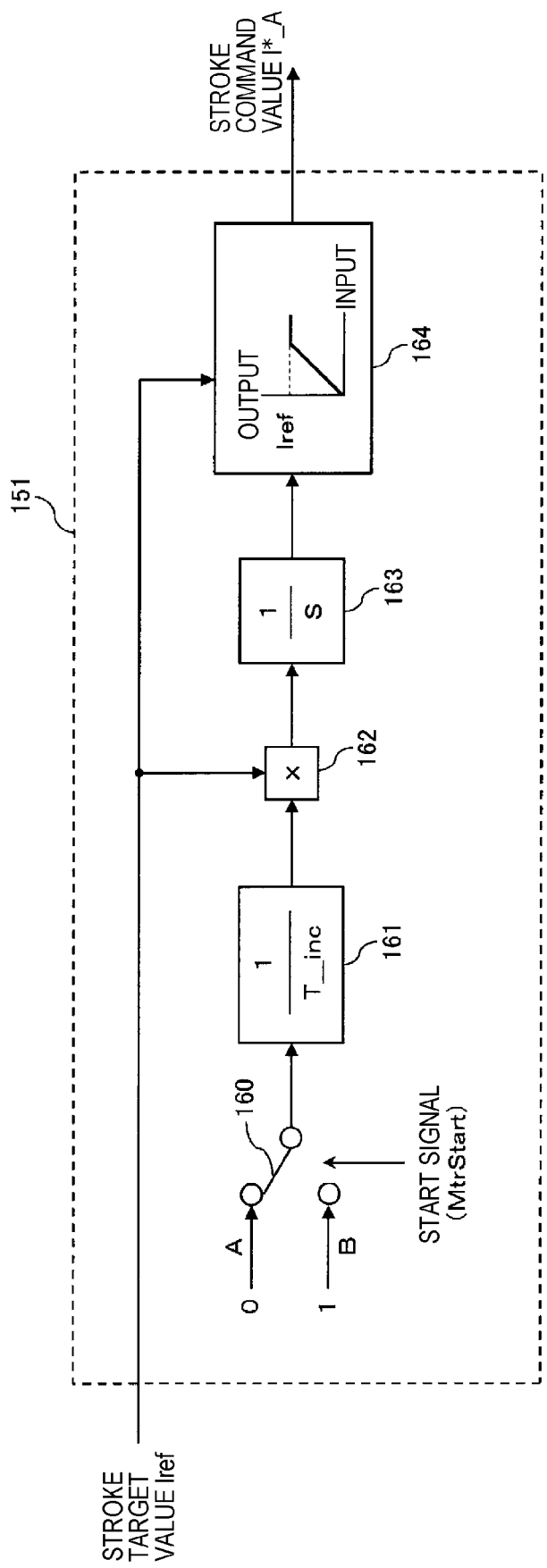
FIG. 14 is an explanatory diagram showing a configuration example of a stroke command generator 151.

FIG. 14 is a diagram describing a configuration of the stroke command generator 151. When a start command (start signal (MtrStart)) of the linear motor 104 is input from the host controller (not shown) or the like, an output of a start signal switcher 160 is changed from 0 to 1 according to the start command. A stroke increase rate calculator 161 divides the output of the start signal switcher 160 by an arrival time (T_inc) to the stroke target value Iref, a multiplier 162 multiplies the divided value by a stroke target value Iref, and an integrator 163 integrates the multiplied value. As a result, a signal having an inclination of Iref/T_inc is obtained. Next, a limiter 164 limits the obtained signal to a value of a limit value input (in the example of FIG. 14, the stroke target value Iref), and obtains a stroke command value l*_A.

In the mode (2) step 163 (FIG. 10), an output value of the stroke controller 153 which is input to a B side of a stroke command switcher 150 (see FIG. 9) is output. The output of the stroke detector 152 and the like are input to the stroke controller 153.

Figure 15:
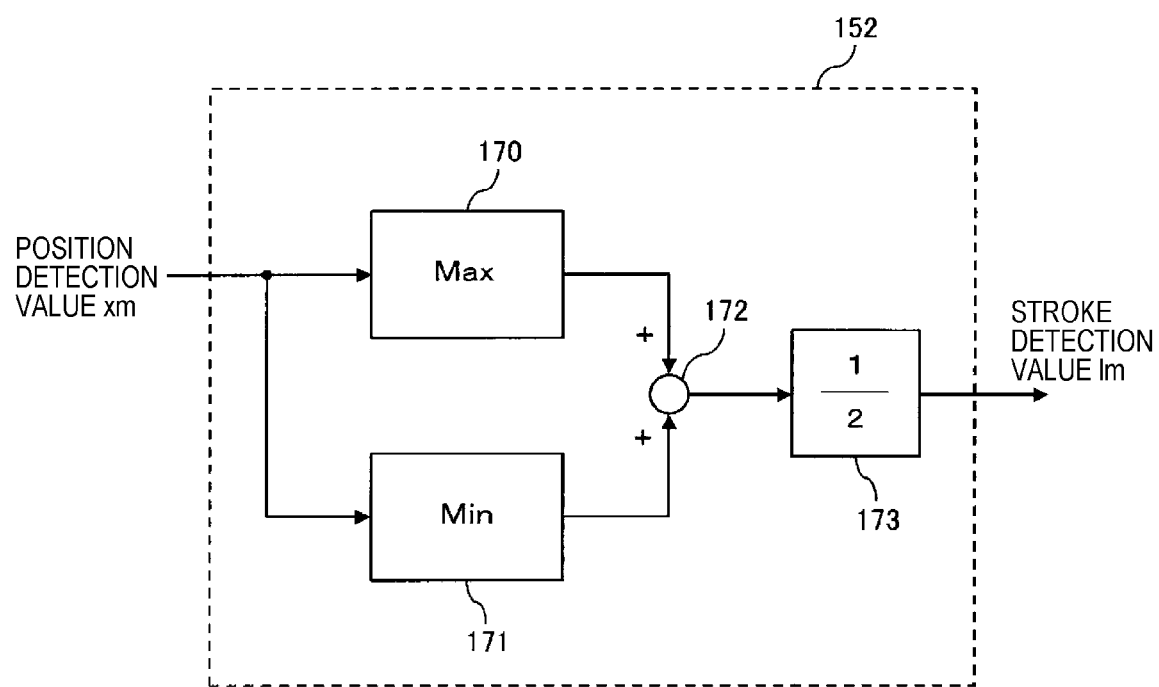
FIG. 15 is an explanatory diagram showing a configuration example of a stroke detector 152.

FIG. 15 is a diagram describing a configuration example of the stroke detector 152. A maximum value detector 170 and a minimum value detector 171 calculate a maximum value and a minimum value of the input value (the position detection value xm in the example of FIG. 15) in a predetermined period (for example, [0, 2π] period of the reference phase θ*). After an adder 172 adds the maximum value and the minimum value, a multiplier 173 multiplies the added value by ½ to obtain a stroke detection value lm.

Figure 16:
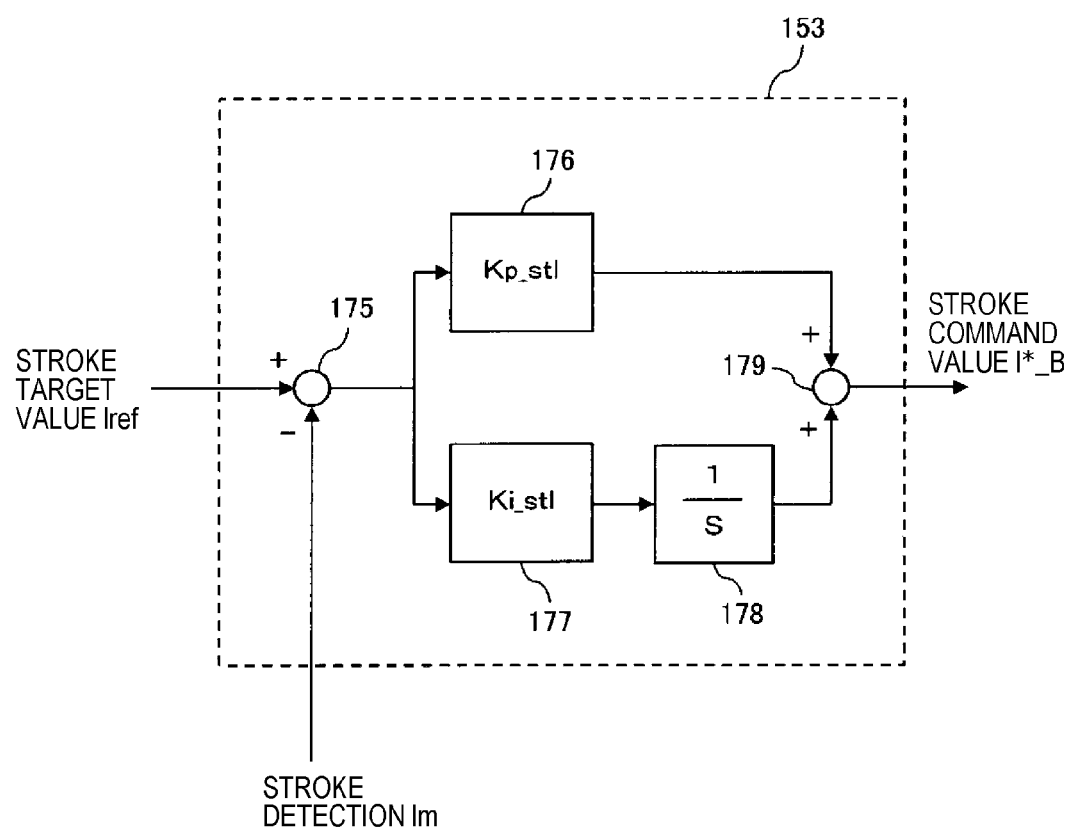
FIG. 16 is an explanatory diagram showing a configuration example of a stroke controller 153.

FIG. 16 is a diagram describing a configuration example of the stroke controller 153. The stroke controller 153 outputs a stroke command value l*_B by allowing a subtractor 175 to obtain a difference between the stroke target value lref and the stroke detection value lm obtained by the stroke detector 152 and allowing an adder 179 to add an proportional-controlled operation result which a multiplier 176 obtains by multiplying the obtained difference by a proportional gain Kp_stl and an integral-controlled operation result which an integrator 178 obtains by integrating the result obtained by allowing the multiplier 177 to multiply the obtained difference by an integral gain Ki_stl.

<PWM Signal Generator 133>

The PWM signal generator 133 uses a known pulse width modulation by comparing the triangular wave carrier signal with the voltage command value Vm*, and generates the drive signal depending on the voltage command value Vm*.

<Power Conversion Circuit 105>

Figure 17:
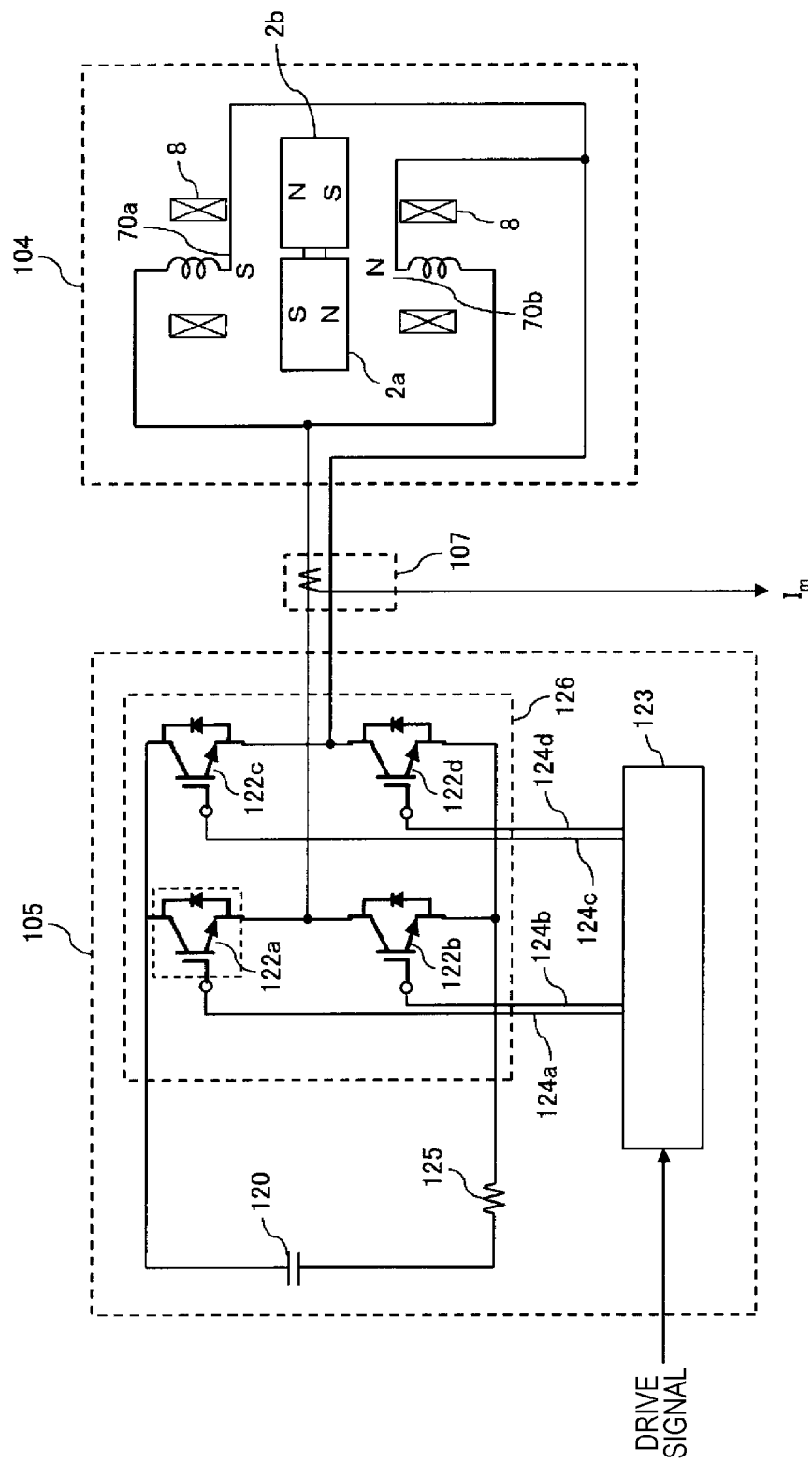
FIG. 17 is a diagram showing a configuration example of a power conversion circuit.

FIG. 17 is a diagram describing a configuration example of the power conversion circuit 105. A full bridge circuit 126 switches the DC voltage source 120 according to the drive signal input from the control unit 102 and outputs a voltage to the linear motor 104. The full bridge circuit 126 includes four switching elements 122, and includes first upper and lower arms (hereinafter, referred to as a U phase) having switching elements 122a and 122b connected in series and second upper and lower arms (hereinafter, referred to as a V phase) having switching elements 122c and 122d. The switching element 122 can perform a switching operation according to pulse-like gate signals (124a to 124d) output from a gate driver circuit 123 based on the voltage command value generated by the control unit 102 or the drive signal by the pulse width modulation.

By controlling a conduction state (on/off) of the switching element 122, a DC voltage corresponding to the AC voltage of the DC voltage source 120 can be output to the winding 8. It is to be noted that the DC current source may be used instead of the DC voltage source 120. As the switching element 122, for example, semiconductor switching elements such as IGBT and MOS-FET can be adopted.

[Connection with Linear Motor 104]

The linear motor 104 is connected between the switching elements 122a and 122b of the first upper and lower arms of the power conversion circuit 105 and between the switching elements 122c and 122d of the second upper and lower arms, respectively. FIG. 17 shows an example in which the windings 8 of the upper and lower armatures 9 are connected in parallel, but the windings 8 can also be connected in series.

[Current Detection Means 107]

The U-phase lower arm and the V-phase lower arm can be provided with a current detector 107 such as a current transformer (CT). As a result, the current Im flowing in the winding of the linear motor 104 can be detected.

As the current detector 107, a phase shunt current scheme in which a shunt resistor 125 is attached to the lower arm of the power conversion circuit 105 instead of the CT, for example to detect a current flowing from the current flowing in the shunt resistor 125 to the linear motor 104 can be adopted. Instead of or in addition to the current detection means 107, a single shunt current detection scheme of detecting the current on the AC side of the power conversion circuit 105 from the DC current flowing in the shunt resistor 125 attached to the DC side of the power conversion circuit 105 may be adopted. The single shunt current detection scheme uses the fact that the current flowing in the shunt resistor 125 varies with time depending on the energization state of the switching element 122 constituting the power conversion circuit 105.

The mode transition voltage command value Vm*1 may be determined by a value obtained by multiplying the DC voltage source 120 of the power conversion circuit by a certain ratio, a ratio of the induced voltage of the linear motor 104 and the DC voltage source 120 of the power conversion circuit, a ratio of the position xm of the mover 6 to the maximum stroke length of the mover 6, and the like.

As described above, according to the first embodiment, it is possible to control the stroke of the mover 6 to be a desired stroke regardless of the load at the time of start and realize the stable start by providing the operation mode (1) of monotonically increasing the amplitude where the frequency of the AC voltage is kept substantially constant, and the operation mode (2) of obtaining a phase difference between the AC voltage of the mover and the position of the mover and changing the frequency of the AC voltage so that the phase difference is a predetermined value while keeping the stroke of the mover constant.

The first embodiment can obtain the effect corresponding to the deviation of the mass of the mover or the like, and therefore is effective even when the load does not fluctuate.

Second Embodiment

A configuration of a second embodiment can be similar to that of the first embodiment except for the following points. In the second embodiment, a resonance frequency is estimated by using a motor current Im and a relative position is estimated using an applied voltage Vm or the motor current Im and the like.

<Linear Motor Driving Apparatus 201>

Figure 18:
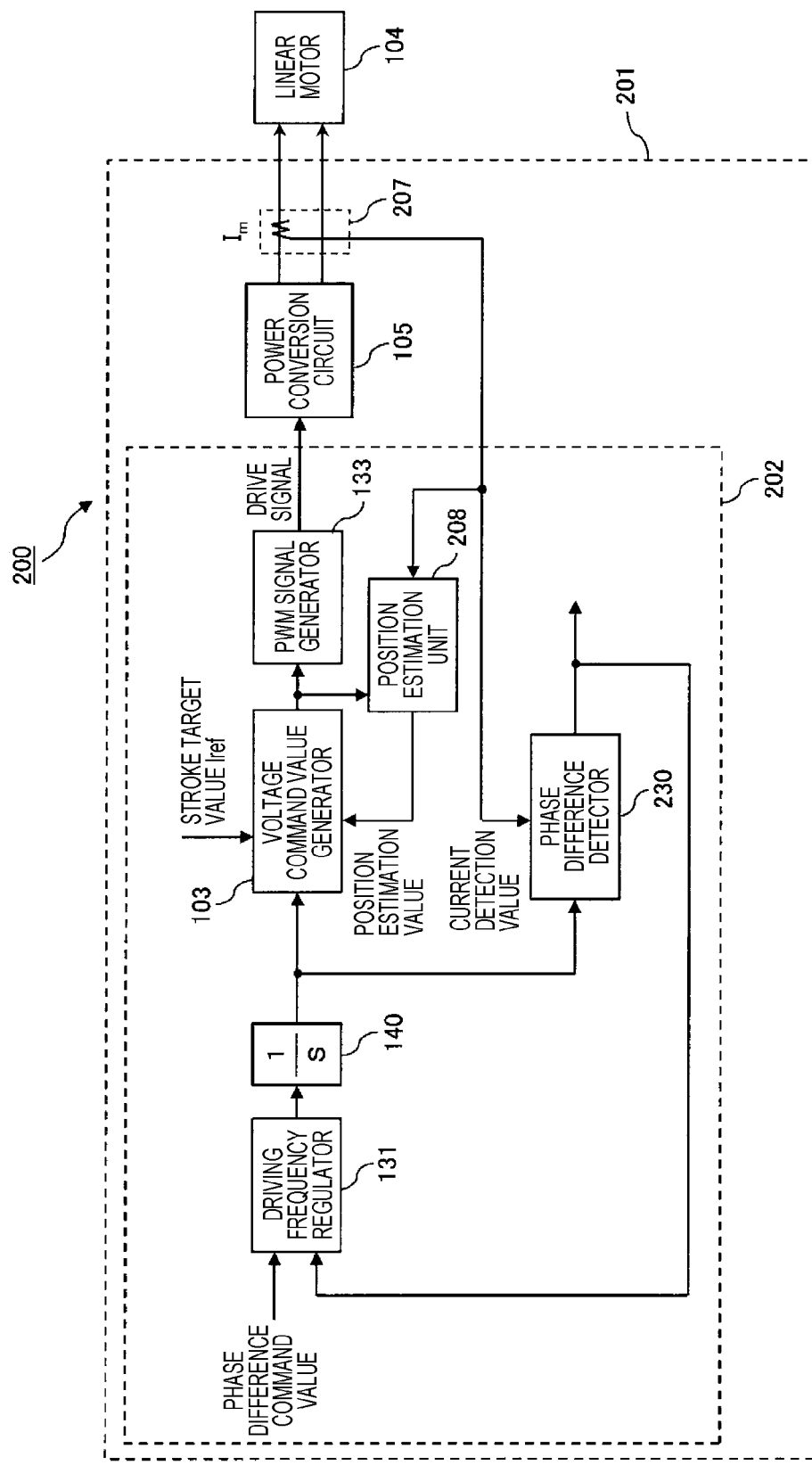
FIG. 18 is an overall schematic configuration diagram of a linear motor system of a second embodiment according to another embodiment of the present invention.

FIG. 18 is an overall schematic configuration diagram of a linear motor system 200 of the second embodiment according to another embodiment of the present invention. The linear motor system 200 is configured to include a linear motor driving apparatus 201 and a linear motor 104.

The linear motor driving apparatus 201 includes a control unit 202 which at least includes a position estimation unit 208 and a phase difference detector 230, a current detector 207, and a power conversion circuit 105.

<Phase Difference Detector 230>

Figure 19:
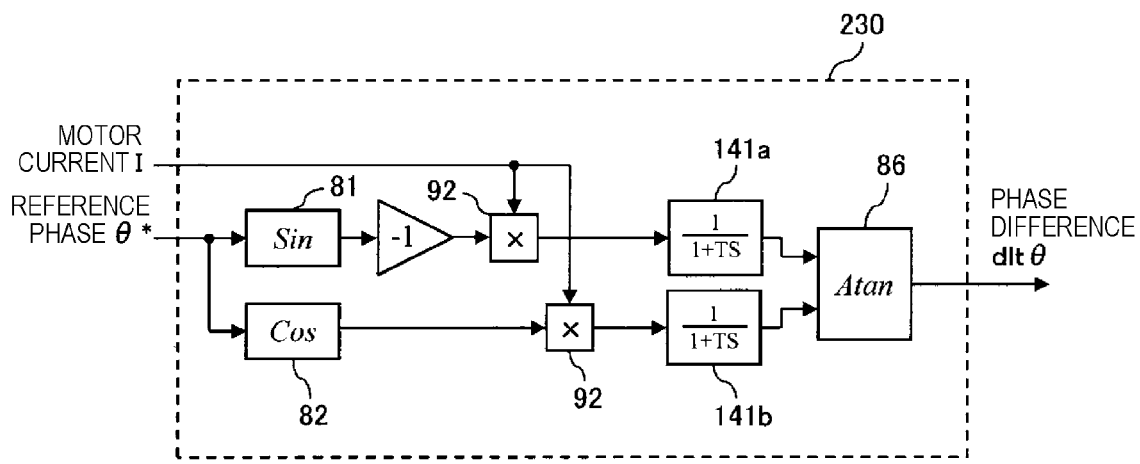
FIG. 19 is an explanatory diagram showing a configuration example of a phase difference detector of the second embodiment.

FIG. 19 is an explanatory diagram showing a configuration example of a phase difference detector 230 of the second embodiment. A phase command value θ* (reference phase θ*) is input to a sine calculator 81 (output a sine of the input value) and a cosine operator 82 (output a cosine of the input value), respectively, to obtain the sine and cosine of the phase command value θ* (reference phase θ*). A value obtained by multiplying each of the sine and the cosine by the motor current Im is output from a multiplier 92. When each of the outputs is calculated by first-order lag filters 141a and 141b which are one example of a lag filter, first-order Fourier coefficients of the sine and the cosine, respectively, are obtained. That is, higher-order frequency components than the driving frequency ω of Fourier expansion can be erased, and therefore can be robust against high-order noise.

The outputs of the first-order lag filters 141a and 141b are input to an arctangent device 86. The arctangent device 86 outputs an arctangent value based on the input sine and cosine components. The arctangent device 86 of the second embodiment outputs an arctangent value of the phase with the numerator as a negative value of the output of the first-order lag filter 141a and a denominator as an output of the first-order lag filter 141*b*. Of course, as described in the first embodiment, a value obtained by inverting the numerator and denominator may be output.

Figure 20:
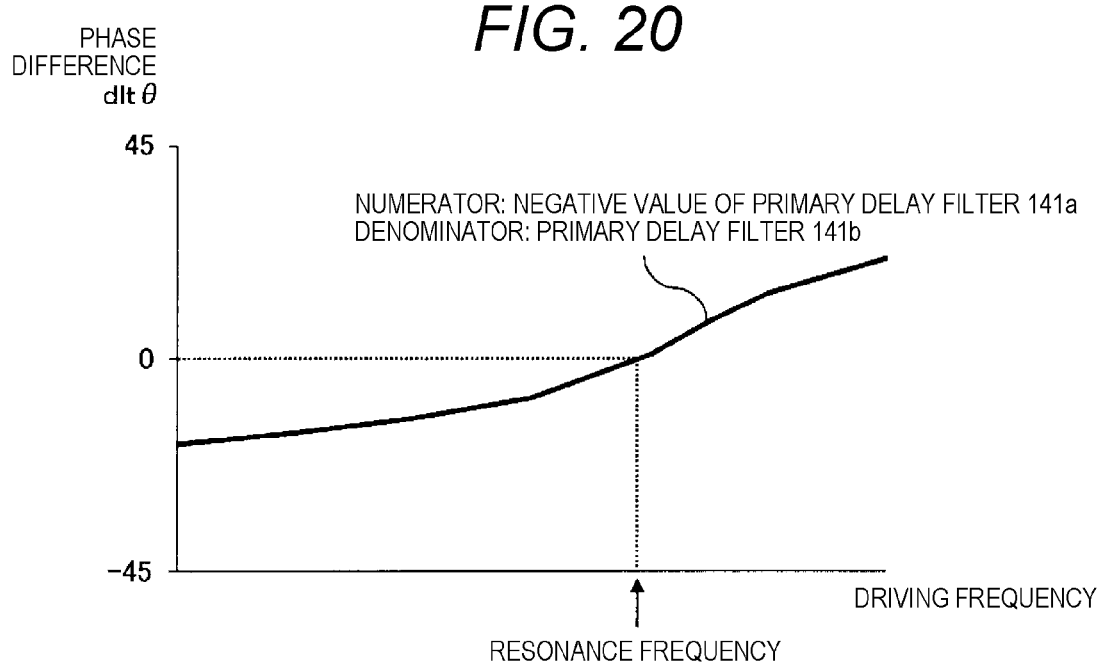
FIG. 20 is an explanatory diagram of a relationship between a driving frequency and an output of the phase difference detector of the second embodiment.

FIG. 20 is a diagram showing a relationship between a driving frequency (horizontal axis) of an AC voltage and an output value (phase difference dltθ) (vertical axis) of the arctangent device 86. In the second embodiment, when the driving frequency is a resonance frequency, 0° is output from the arctangent device 86. The value output from the arctangent device 86 is larger than 0° when the driving frequency is higher than the resonance frequency and smaller than 0° when the driving frequency is lower than the resonance frequency. By doing so, it is possible to obtain the phase difference dltθ of the primary frequency component of the input AC signal (the position xm of the mover 6 in the second embodiment) to the phase difference detector 230 with respect to the reference phase θ* and estimate the resonance frequency.

<Position Estimation Means 208>

A position estimation unit 208 estimates the position of the mover 6. For example, the position estimate value xm^ is obtained by, for example, the following Equation (5) using the voltage Vm applied to the linear motor 104 and the current Im flowing in the linear motor 104.

[Equation 5]

$$\hat{x_m} = \frac{1}{K_e^*}\left\{\int (V_m^* - R_m^* \cdot I_m)dt - L_m^* \cdot I_m\right\} \quad (5)$$

In the above Equation (5), Vm * is the voltage command value Vm* to be applied to the linear motor 104.

Figure 21:
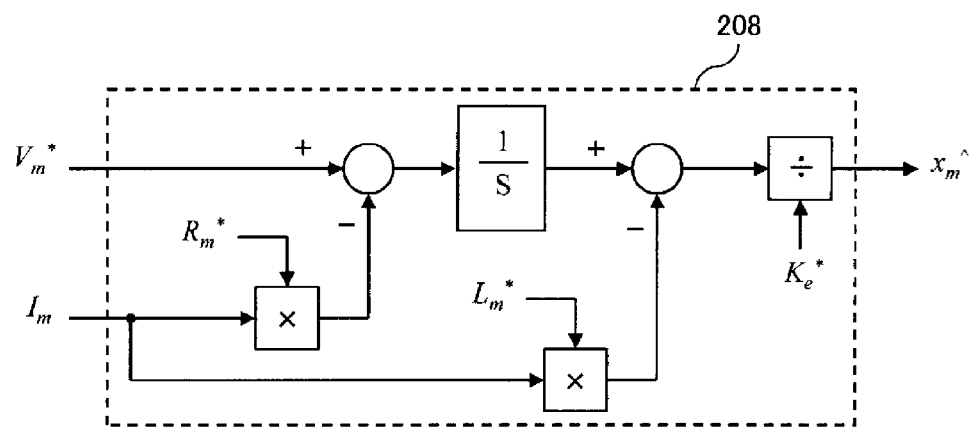
FIG. 21 is an explanatory diagram showing a configuration example of a position estimation unit.

FIG. 21 is an explanatory diagram showing a configuration example of the position estimation unit 208, and is an explanatory diagram in a case where the above Equation (5) is shown in a block diagram. In addition to the above values, a position estimation method of a known synchronous motor can be applied to the position estimation unit 208. By inputting the position estimation value xm^to the stroke detector 152 in FIG. 15, it is possible to perform control the stroke of the mover to a desired stroke.

As described above, according to the second embodiment, the position of the mover 6 is estimated from the voltage applied to the linear motor 104 and the current flowing in the linear motor 104, and the resonance frequency is detected or estimated with high accuracy based on the position estimation value, thereby providing the linear motor driving with high efficiency. In addition, it is possible to realize the driving of the linear motor which can control the stroke of the mover 6 to be a desired stroke regardless of the load at the time of start and realize the stable start by providing the operation mode (1) of monotonically increasing the amplitude where the frequency of the AC voltage is kept substantially constant, and the operation mode (2) of obtaining the phase difference between the AC voltage of the mover and the position of the mover and changing the frequency of the AC voltage so that the phase difference is a predetermined value while keeping the stroke of the mover constant.

Third Embodiment

A configuration of a third embodiment can be similar to that of the first and second embodiments except for the following points. The third embodiment relates to a hermetic type compressor 50 as an example of a device on which a linear motor system 100 is mounted. As the device, it is possible to use a device or the like which gives a load that fluctuates depending on a phase θ or a driving frequency ω with respect to the reciprocating vibrating body (mover 6).

<Hermetic Type Compressor 50>

Figure 22:
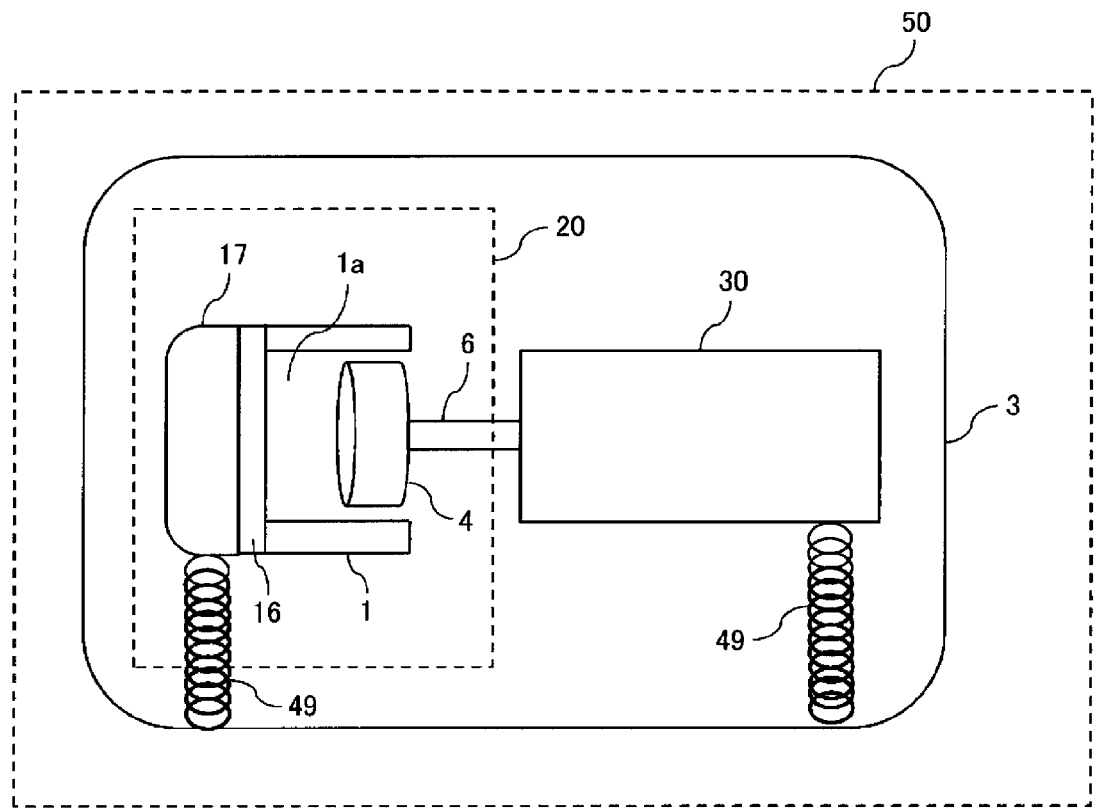
FIG. 22 is a longitudinal cross-sectional view of a hermetic type compressor of a third embodiment according to still another embodiment of the present invention.

FIG. 22 is a longitudinal cross-sectional view of a hermetic type compressor of the third embodiment according to another embodiment of the present invention, which is an example of a longitudinal cross-sectional view of a hermetic type compressor 50 having a linear motor 104. The hermetic type compressor 50 is a reciprocating compressor in which a compression element 20 and an electric element 30 are arranged in a hermetic container 3. The compression element 20 and the electric element 30 are resiliently supported in the hermetic container 3 by a support spring 49. The electric element 30 includes a mover 6 and an armature 9.

The compression element 20 includes a cylinder block 1 forming a cylinder 1*a*, a cylinder head 16 assembled on an end face of the cylinder block 1, and a head cover 17 forming a discharge chamber space. A working fluid supplied into the cylinder 1*a* is compressed by a reciprocating motion of a piston 4, and the compressed working fluid is sent to a discharge pipe (not shown) communicating with an outside of the compressor.

The piston 4 is attached to one end of the mover 6. In the third embodiment, the mover 6 and the piston 4 reciprocate to compress and expand the working fluid. This load corresponds to a load in which work required for compression and expansion varies. The compression element 20 is disposed at one end of the electric element 30. The cylinder block 1 has a guide rod for guiding the reciprocating motion of the mover 6 along a front-back direction.

When the linear motor 104 is installed in the hermetic container 3, a connector having airtightness which is called a hermetic connector or a hermetic seal is sometimes used. In order to maintain the airtightness, it is preferable to minimize the number of connectors. Therefore, a linear motor system 300 (FIG. 23) according to the third embodiment estimates a position of the mover 6 from a voltage Vm applied to the linear motor 104 and the motor current Im flowing in the linear motor 104, detects or estimates a resonance frequency with high accuracy based on a position estimation value xm^, and provides driving of a linear motor with high efficiency.

In the case of adding a resonance spring 23 (not shown in FIG. 22) which is an elastic body to the mover 6 and reciprocating the mover 6 at a mechanical resonance frequency determined from a mass of the mover 6 and a spring constant, it is necessary to consider the influence on the resonance frequency by the compression element 20. That is, a spring-like action of a working fluid is added by the pressure of the discharge space, so a resonance state frequency is changed. That is, when the pressure in the cylinder 1*a* is high, the spring constant of the resonance spring 23 attached to the mover 6 is equivalent to a high spring constant, and the resonance frequency is high. On the contrary, when the pressure in the cylinder 1*a* is low, the spring constant of the resonance spring 23 attached to the mover 6 becomes dominant, and the resonance frequency approximates the mechanical resonance determined from the mass of the mover 6 and the spring constant.

In addition, if the resonance frequency is estimated without considering the pressure inside the cylinder 1*a*, the stroke of the mover 6 is larger than expected, and the piston 4 may collide with the cylinder head 16. If the piston 4 collides with a cylinder head 16, noise not only occurs, but also in the worst case, the piston 4 or the cylinder head 16 can be damaged. Therefore, it is preferable to appropriately control the stroke even at the time of transient such as start.

Figure 23:
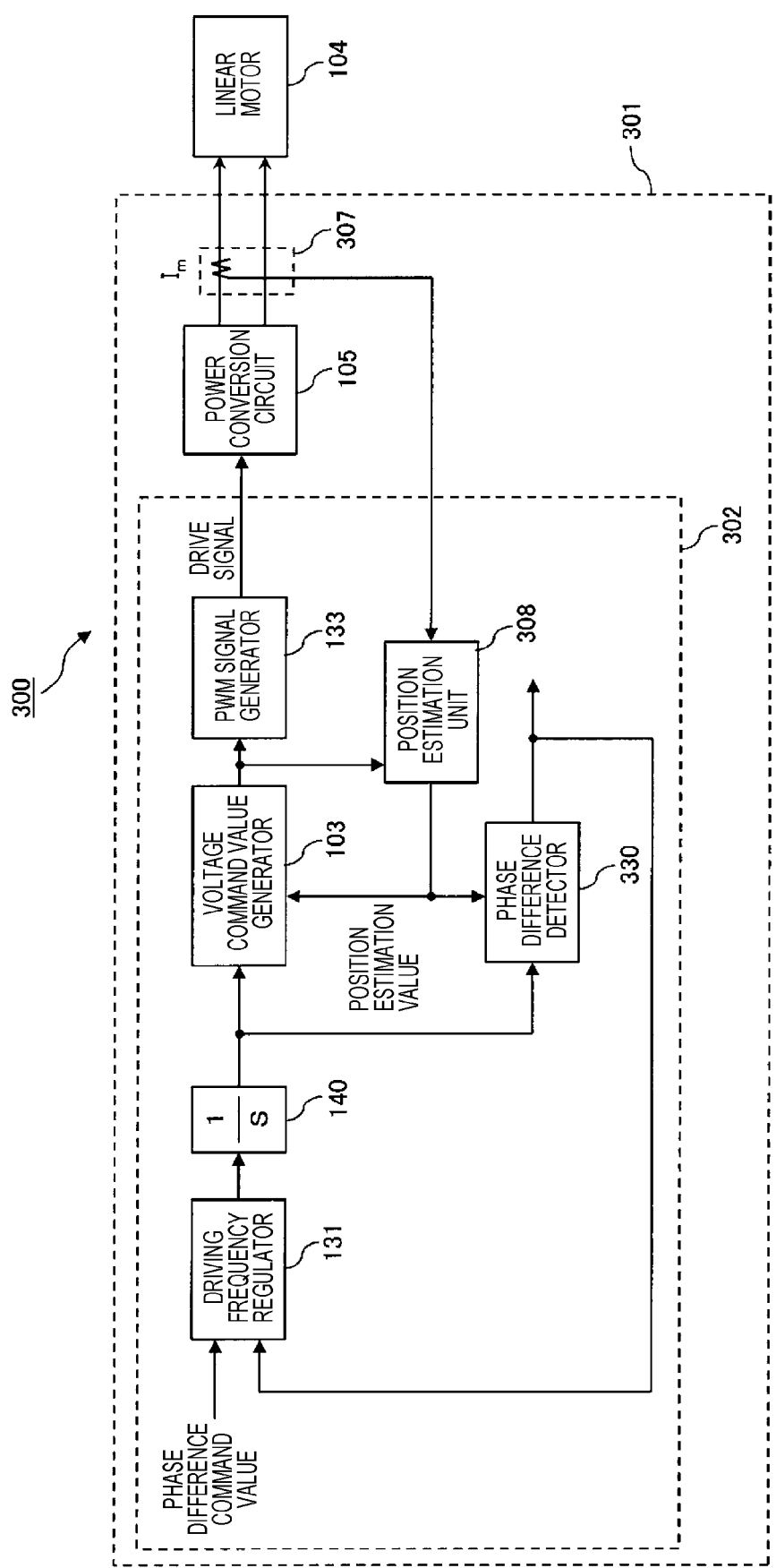
FIG. 23 is an overall schematic configuration diagram of a linear motor system of the third embodiment.

In this way, when the linear motor 104 is used as the power of the compression element 20, the resonance frequency is changed depending on the condition of the compression element 20. Even in such a case, in order to obtain a desired stroke, it is necessary to detect or estimate the resonance frequency varying depending on conditions with high accuracy. Therefore, as shown in FIG. 23, the linear motor system 300 according to the third embodiment can estimate a position of the mover 6 from a voltage applied to the linear motor 104 and the motor current flowing in the linear motor 104, detect or estimate a resonance frequency with high accuracy based on a position estimation value, and realize driving of a linear motor with high efficiency. Since the position of the mover 6 can be estimated based on the applied voltage Vm or the motor current Im, the necessity of disposing the position sensor in the hermetic container 3 which is in a high temperature and high pressure environment can be reduced. In addition, by appropriately switching the control gain according to the load (for example, proportional to the difference between a suction pressure and a discharge pressure of the pressure element 20) of the linear motor 104, driving of the linear motor which can start and can be stably driven even under wide load conditions such as no load (the state in which the suction pressure and the discharge pressure of the pressure element 20 are equalized) to heavy load can be realized.

<Start Control and the Like by Linear Motor Driving Apparatus 301>

FIG. 23 is an overall schematic configuration diagram of the linear motor system 300 of the third embodiment. The linear motor system 300 is configured to include a linear motor driving apparatus 301 and a linear motor 104.

The linear motor driving apparatus 301 includes a control unit 302 which at least includes a position estimation unit 308 and a phase difference detector 330, a current detector 307, and a power conversion circuit 105.

Figure 24:
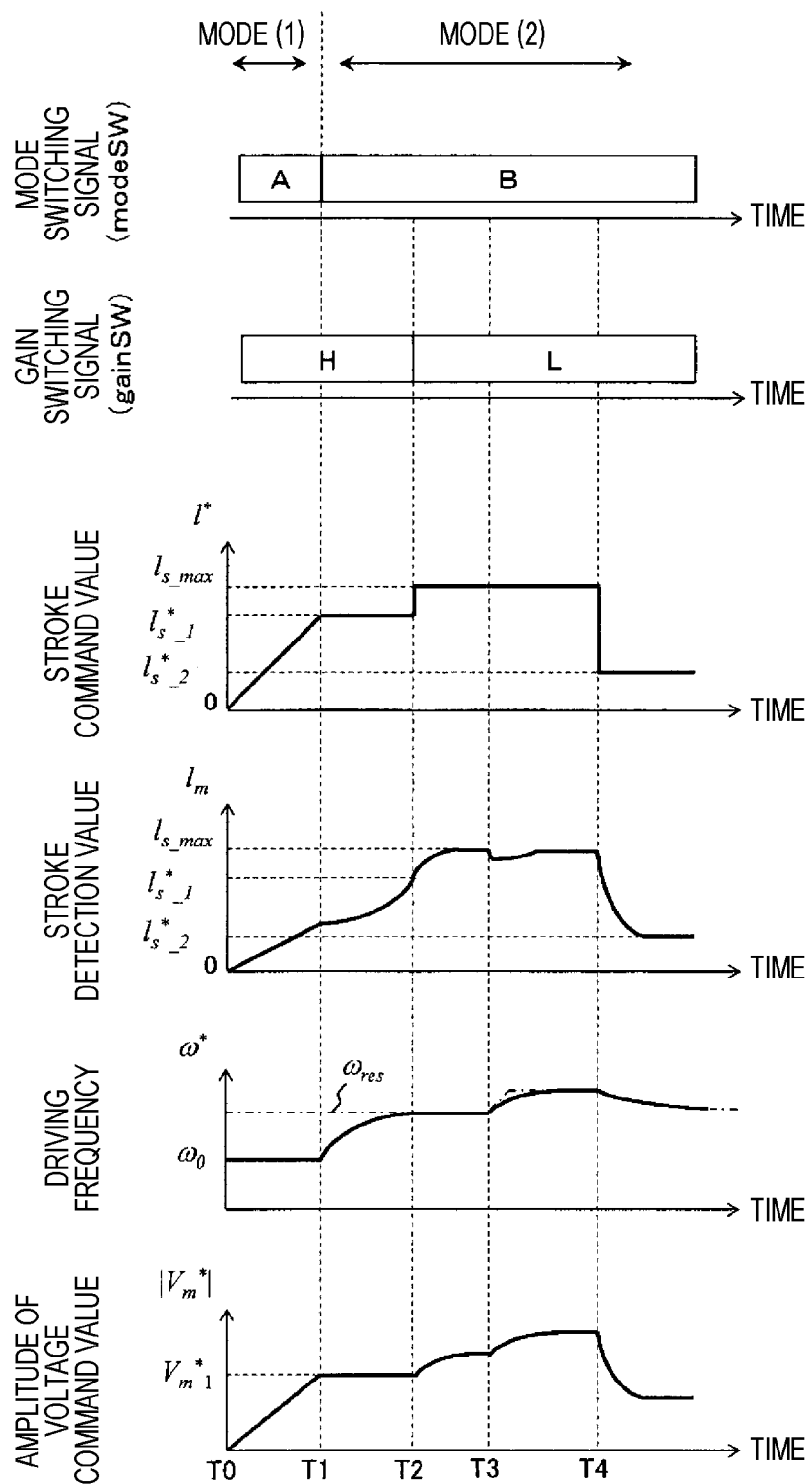
FIG. 24 is an explanatory diagram of a start sequence of the third embodiment.

FIG. 24 is a view for describing a temporal change in a main command value in each start sequence. In FIG. 24, as compared with FIG. 11, a gain switching signal (gainSW) is added. The gain switching signal (gainSW) switches a control gain of each controller (for example, a stroke controller 353 shown in FIG. 25) according to the state (H or L). A control gain of a state H is larger than a control gain of a state L.

As the settings of the states H and L, for example, it is possible to set the heavy load to be the state H and the no load or the light load to be state L. A level of the load may be set by paying attention to a short-term fluctuation in which the expansion of the working fluid is a light load and the compression of the working fluid is a heavy load, and paying attention to a long-term fluctuation in which a time period in which a flow rate is relatively small is a light load and a time period in which a flow rate is relatively large is a heavy load.

It is to be noted that the determination on the light load and the heavy load (determination on the level of the load) can be made by previously obtaining the information on the resonance frequency when the hermetic type compressor 50 is in a no load and comparing the previously obtained information with it. Specifically, since the resonance frequency is decreased as the load is increased, it is possible to estimate the level of the load by examining how much it is resonated at a value different from the resonance frequency at the time of no load.

When the hermetic type compressor 50 is driven, it is preferable to control the hermetic type compressor 50 at the resonance frequency in a short time at the time of start. In order to shorten a response time of the controller, the control gain may be increased (for example, the proportional gain Kp_stl shown in FIG. 25). However, if the control gain is increased more than necessary, there is a problem in that it is oscillatory in a steady state (state where the difference from the command value is small).

Figure 25:
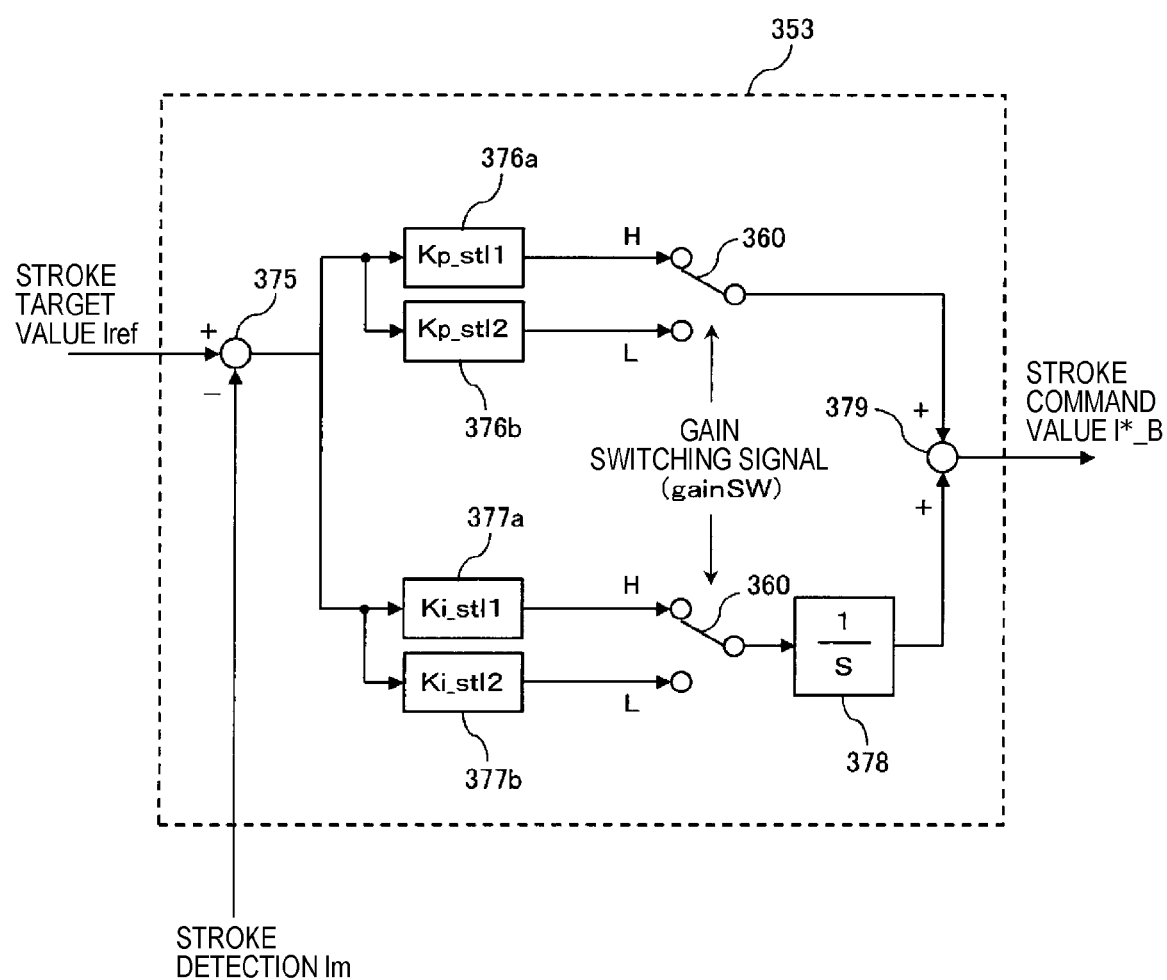
FIG. 25 is an explanatory diagram showing a configuration example of a stroke controller 353 of the third embodiment.

FIG. 25 is a diagram describing a configuration of a stroke controller 353 of the third embodiment. A gain switcher 360 switches a control gain (the proportional gain Kp_stl and the integral gain Ki_stl) of a multiplier 376 and a multiplier 377 according to the state (H or L) of the gain switching signal (gainSW).

In the third embodiment, the state H is set immediately after the start, and since a change speed (time differential value) of the amplitude of the voltage is increased, it is easy to perform the mode (1) at high speed and transition the mode (1) to the mode (2). Then, it is assumed that the gain switching signal is switched from H to L at time T2 during the execution of the mode (2). At the initial stage of the start up to the time T2, the deviation between the driving frequency and the resonance frequency is large depending on the condition of the compression element 20. In such a state, the driving of the linear motor is realized with high efficiency by detecting or estimating the resonance frequency with high accuracy in a short time, the stroke of the mover 6 is controlled to the desired stroke regardless of the load at the time of the start, and the control gain is increased in order to achieve the stable start.

On the other hand, if the driving frequency substantially coincides with the resonance frequency, this time is set to T2, and the control gain is decreased. In the state in which the driving frequency and the resonance frequency substantially coincide with each other, the mechanical time constant of the compression element 20 is longer than the electric time constant of the electric element 30. That is, the change in the resonance frequency according to the condition of the compression element 20 is sufficiently longer than the response time of each controller. Therefore, the control gain is decreased.

Time T4 in FIG. 24 is a moment that a required flow rate (obtained by a product of the strokes and the driving frequency) of the compression element 20 is changed (decreased) from the host controller (not shown) and the like and the stroke command value l* is decreased. In this case, after the stroke detection value lm reaches the stroke command value ls*_2, the influence on the resonance frequency by the compression element 20 starts and the resonance frequency is decreased. In this case, if the driving frequency is increased by the driving frequency regulator 131 more than necessary, there is the probability that the driving frequency is not be stabilized. Therefore, likewise, the gain switcher 360 (see FIG. 25 and the like) is also included in the driving frequency regulator 131, and switches the control gain (proportional gain Kp_adtr and integral gain Ki_adtr) of the multiplier 92b and the multiplier 92c constituting the driving frequency regulator 131 shown in FIG. 13 depending on the state (H or L) of the gain switching signal (gainSW).

As described above, according to the third embodiment, the position of the mover 6 is estimated from the voltage applied to the linear motor 104 and the current flowing in the linear motor 104, and the resonance frequency is detected or estimated with high accuracy based on the position estimation value, thereby realizing the linear motor driving with high efficiency. In addition, it is possible to provide the driving of the linear motor which can control the stroke of the mover 6 to be a desired stroke regardless of the load at the time of start and realize the stable start by providing the operation mode (1) of monotonically increasing the amplitude where the frequency of the AC voltage is kept substantially constant, and the operation mode (2) of obtaining the phase difference between the AC voltage of the mover and the position of the mover and changing the frequency of the AC voltage so that the phase difference is a predetermined value while keeping the stroke of the mover constant. In addition, by appropriately switching the control gain according to the load (for example, proportional to the difference between a suction pressure and a discharge pressure of the pressure element 20) of the linear motor 104, driving of the linear motor which can start and can be driven stably even under wide load conditions such as no load (the state in which the suction pressure and the discharge pressure of the pressure element 20 are equalized) to heavy load can be realized.

As the compressor shown in the third embodiment, a compressor for pumping a refrigerant in an air conditioner including a heat exchanger functioning as a condenser or an evaporator can be applied. In addition, as the linear motor driving apparatus for controlling the driving of the compressor, the linear motor driving apparatus described in the first or second embodiment can be adopted.

In addition, as the compressor shown in the third embodiment, a compressor which compresses a working fluid in order to adjust a vehicle height in an air suspension can be applied. In addition, as the linear motor driving apparatus for controlling the driving of the compressor, the linear motor driving apparatus described in the first or second embodiment can be adopted.

In addition, as the compressor shown in the third embodiment, a compressor which pumps a liquid refrigerant in a refrigerator having a condenser and an evaporator can be applied. In addition, as the linear motor driving apparatus for controlling the driving of the compressor, the linear motor driving apparatus described in the first or second embodiment can be adopted.

The present invention is not limited to the above-described embodiments, but includes various modified examples. For example, the above-described embodiments have been described in detail in order to explain the present invention in an easy-to-understand manner, and are not necessarily limited to those having all the configurations described.

In addition, a part or all of the above-described configurations, functions, processing units, processing procedure, and the like may be designed in, for example, an integrated circuit and the like to be realized by hardware. In addition, each of the above-described configurations, functions, or the like may interpret and execute a program that allows the processor to realize each function to be realized by software.

REFERENCE SIGNS LIST

1 cylinder block
1*a* cylinder
2 permanent magnet
3 hermetic container
4 piston
6 mover
7 magnetic pole
8 winding
9 armature
16 cylinder head
17 head cover
20 compression element
23 resonance spring (assist spring)
30 electric element
50 hermetic type compressor
100, 200, 300 linear motor system
101, 201, 301 linear motor driving apparatus
102, 202, 302 control unit
103 voltage command value generator
104 linear motor
105 power conversion circuit
107 current detector
122 switching element
126 full bridge circuit
130, 230, 330 phase difference detector
131 driving frequency regulator
133 PWM signal generator

The invention claimed is:

1. A linear motor control apparatus, configured to control a linear motor, including a winding to which an AC voltage is applied and a mover which is connected to an elastic body, the linear motor control apparatus, comprising:
a controller configured to perform:
an operation mode (1) which linearly increases amplitude of a voltage command value while keeping a frequency of the AC voltage substantially constant, and
an operation mode (2) which changes the frequency of the AC voltage while keeping the amplitude of the voltage command value substantially constant,
wherein the linear motor is configured to drive a piston having a stroke, the piston attached to the mover,
wherein the controller is configured to execute the operation mode (1) and the operation mode (2) in order of the operation mode (1) and the operation mode (2),
wherein the controller is configured to:
execute the operation mode (1) immediately after a start of the linear motor,
set a stroke range of the piston at the start of the linear motor regardless of a load at the start,
where a stroke command is linearly increased from zero and a stroke command value deviates from a stroke detection value depending on whether the driving frequency substantially coincides with a resonance frequency of the mover,
estimate a position of at least one of the mover or the resonance frequency of the mover after amplitude of the position of the mover is linearly increased to a predetermined value or more in the operation mode (1), and
change the frequency while keeping the amplitude of the voltage command value substantially constant, and then increase the amplitude of the voltage command value in the operation mode (2).

2. The linear motor control apparatus according to claim 1, further comprising:
a load which is connected to the mover,
wherein a fluctuation of the load is estimated from a difference between a frequency of the AC voltage and the resonance frequency of the mover detected or estimated, and
one, two, or three time differential values of the amplitude of the voltage command value, the frequency of the AC voltage, and the amplitude of the mover are larger when the load is a heavy load than when the load is a light load.

3. A compressor, comprising:
the linear motor control apparatus according to claim 2,
wherein a position of the mover is estimated using voltage and current values of the winding.

4. The linear motor control apparatus according to claim 1, further comprising:
a load which is connected to the mover,
wherein a fluctuation of the load is estimated from a difference between a frequency of the voltage command value and the resonance frequency of the mover detected or estimated, and
a control gain or a control time constant for a stroke of the mover, a current flowing in the winding, or a speed of the mover is changed according to the load.

5. A compressor, comprising:
the linear motor control apparatus according to claim 4,
wherein a position of the mover is estimated using voltage and current values of the winding.

6. A compressor, comprising:
the linear motor control apparatus according to claim 1,
wherein a position of the mover is estimated using voltage and current values of the winding.

* * * * *